(12) United States Patent
Jia et al.

(10) Patent No.: US 12,713,422 B2
(45) Date of Patent: Aug. 18, 2026

(54) RESOURCE SCHEDULING METHOD AND COMMUNICATION APPARATUS

(71) Applicant: HUAWEI TECHNOLOGIES CO., LTD., Shenzhen (CN)

(72) Inventors: Qiong Jia, Shanghai (CN); Jiayin Zhang, Shanghai (CN); Ji Wu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 525 days.

(21) Appl. No.: 17/513,975

(22) Filed: Oct. 29, 2021

(65) Prior Publication Data

US 2022/0053523 A1 Feb. 17, 2022

Related U.S. Application Data

(63) Continuation of application No. PCT/CN2020/087921, filed on Apr. 29, 2020.

(30) Foreign Application Priority Data

Apr. 30, 2019 (CN) ........................ 201910365416.6

(51) Int. Cl.
*H04W 72/1263* (2023.01)
*H04W 72/0446* (2023.01)
(Continued)

(52) U.S. Cl.
CPC ... *H04W 72/1263* (2013.01); *H04W 72/0446* (2013.01); *H04W 72/0453* (2013.01); *H04W 74/0816* (2013.01); *H04W 74/0866* (2013.01)

(58) Field of Classification Search
None
See application file for complete search history.

(56) References Cited

U.S. PATENT DOCUMENTS

2013/0260820 A1 10/2013 Schmandt et al.
2016/0353415 A1* 12/2016 Sarkar ................ H04W 72/542
(Continued)

FOREIGN PATENT DOCUMENTS

CN 102076102 A 5/2011
CN 103796327 A 5/2014
(Continued)

OTHER PUBLICATIONS

3GPP TS 38.331 V15.5.1 (Apr. 2019), 3rd Generation Partnership Project; Technical Specification Group Radio Access Network;NR-;Radio Resource Control (RRC) protocol specification(Release 15), total 491 pages.
(Continued)

*Primary Examiner* — Saad Khawar

(57) ABSTRACT

A resource scheduling method and a communication apparatus are disclosed. The resource scheduling method includes: A network device determines scheduling indication information, where the scheduling indication information is used to indicate that the network device performs scheduling for one transmission unit, or the scheduling indication information is used to indicate that the network device performs scheduling for multiple transmission units. The network device sends the scheduling indication information to a terminal. In this application, when there are multiple transmission units, a manner in which the terminal simultaneously performs transmission for the multiple transmission units may be explicitly indicated. In addition, this helps reduce overheads of performing LBT by the terminal for the multiple transmission units.

40 Claims, 10 Drawing Sheets

(51) Int. Cl.

| | |
|---|---|
| ***H04W 72/0453*** | (2023.01) |
| ***H04W 74/08*** | (2024.01) |
| ***H04W 74/0816*** | (2024.01) |

(56) References Cited

U.S. PATENT DOCUMENTS

| | | | | |
|---|---|---|---|---|
| 2019/0052432 | A1 | 2/2019 | Islam et al. | |
| 2019/0053211 | A1 | 2/2019 | Ying et al. | |
| 2021/0274536 | A1 * | 9/2021 | Shin | H04W 72/535 |
| 2022/0014333 | A1 * | 1/2022 | Bhamri | H04W 72/0446 |

FOREIGN PATENT DOCUMENTS

| | | | |
|---|---|---|---|
| CN | 108024363 | A | 5/2018 |
| CN | 108282283 | A | 7/2018 |
| CN | 108282879 | A | 7/2018 |
| CN | 108632965 | A | 10/2018 |
| CN | 108886797 | A | 11/2018 |
| CN | 109076569 | A | 12/2018 |
| CN | 110035509 | A | 7/2019 |
| CN | 111867118 | B | 4/2022 |
| WO | 2019050143 | A1 | 3/2019 |

OTHER PUBLICATIONS

3GPP TS 37.213 V15.2.0 (Mar. 2019), 3rd Generation Partnership Project; Technical Specification Group Radio Access Network; Physical layer procedures for shared spectrum channel access(Release 15), 20 pages.

Huawei, HiSilicon, Scheduling of multiple transport blocks. 3GPP TSG RAN WG1 Meeting #96bis, Xi'an, China, Apr. 8-12, 2019, R1-1903917, 7 pages.

3GPP TS 38.214 V15.5.0 (Mar. 2019), 3rd Generation Partnership Project; Technical Specification Group Radio Access Network; NR; Physical layer procedures for data (Release 15), 103 pages.

LG Electronics, Discussion on multiple transport blocks scheduling in MTC. 3GPP TSG RAN WG1 #96, Athens, Greece, Feb. 25-Mar. 1, 2019, R1-1902057, 9 pages.

Office Action issued in CN201910365416.6, dated Aug. 4, 2021, 11 pages.

International Search Report and Written Opinion issued in PCT/CN2020/087921, dated Jul. 20, 2020, 12 pages.

New Postcom, Multi-TTI scheduling for diverse data applications. 3GPP TSG-RAN2#75, Aug. 22-26, 2011, Athens, Greece, R2-114138, 3 pages.

European Search Report for Application No. 207988114 dated Jun. 8, 2022, 7 pages.

MediaTek Inc., Summary of Offline on Cross-Slot Scheduling, 3GPP TSG RAN WG1 Meeting #96-Bis R1-1905819 Xi'an, China, Apr. 8-12, 2019, total 12 pages.

* cited by examiner

RESOURCE SCHEDULING METHOD AND COMMUNICATION APPARATUS

CROSS-REFERENCE TO RELATED APPLICATIONS

This application is a continuation of International Application No. PCT/CN2020/087921, filed on Apr. 29, 2020, which claims priority to Chinese Patent Application No. 201910365416.6, filed on Apr. 30, 2019. The disclosures of the aforementioned applications are hereby incorporated by reference in their entireties.

TECHNICAL FIELD

This application relates to the field of communication technologies, and in particular, to a resource scheduling method and a communication apparatus.

BACKGROUND

With constant development of wireless technologies, spectrum resources of wireless communication systems are increasingly scarce, and licensed bands already cannot meet increasing service requirements. Unlicensed bands are used for communication in more wireless communication systems, for example, a 5th generation (5G) mobile communication system or a next-generation mobile communication system.

A communication system deployed in an unlicensed spectrum usually uses/shares a radio resource through contention. To be specific, network element devices in the wireless communication system use a same or similar principle to fairly compete for and use an unlicensed spectrum resource. For example, when using a time-frequency resource in an unlicensed frequency band, a terminal needs to perform listen before talk (LBT) detection. The terminal can use the time-frequency resource only when determining, based on a result of the LBT detection, that the time-frequency resource is idle.

In a 5G wireless communication system, a network device may perform scheduling by using a slot as a basic transmission unit, or may perform scheduling by using a mini-slot as a basic transmission unit. A current 5G system supports only scheduling for a single transmission unit, that is, information indicated in scheduling signaling sent by the network device is only for the single transmission unit. However, in the unlicensed spectrum, because the terminal needs to perform LBT detection before transmission, if the current scheduling manner in which scheduling is performed for the single transmission unit is used, multiple transmission units are separately scheduled. In this case, the terminal needs to perform LBT detection for each transmission unit. In this way, LBT overheads are large. Therefore, in this case, how the network device indicates scheduling for multiple transmission units to the terminal is a problem that needs to be urgently resolved currently.

SUMMARY

This application provides a resource scheduling method and a communication apparatus to resolve a technical problem of how to indicate a terminal to perform transmission for multiple transmission units.

According to a first aspect, an embodiment of this application provides a resource scheduling method. The method includes: A network device determines scheduling indication information, where the scheduling indication information is used to indicate that the network device performs scheduling for one transmission unit, or the scheduling indication information is used to indicate that the network device performs scheduling for multiple transmission units. Then, the network device sends the scheduling indication information to a terminal.

The method may be performed by a first communication apparatus. The first communication apparatus may be a communication device or a communication apparatus, for example, a chip system, that can support the communication device in implementing a required function of the method. For example, the communication device is the network device.

In this embodiment of this application, the network device may indicate, by using the scheduling indication information, whether a scheduled transmission unit is the transmission unit or the multiple transmission units. It can be learned that, according to the method provided in this embodiment of this application, when there are multiple transmission units, a manner in which the terminal simultaneously performs transmission for the multiple transmission units may be explicitly indicated. In addition, this helps reduce overheads of performing LBT by the terminal for the multiple transmission units.

With reference to the first aspect, in an example implementation of the first aspect, the scheduling indication information is further used to indicate the terminal to perform transmission based on a scheduling indication of the network device, or the scheduling indication information is further used to indicate the terminal to perform transmission based on a result of listen before talk (LBT).

With reference to the first aspect, in an example implementation of the first aspect, the scheduling indication information is used to indicate that the network device performs scheduling for the multiple transmission units, and the scheduling indication information includes multiple scheduling parameters, where each of the multiple scheduling parameters comprises one value; or at least one of the multiple scheduling parameters comprises multiple values, and another parameter other than the at least one scheduling parameter comprises one value.

With reference to the first aspect, in an example implementation of the first aspect, the scheduling indication information is used to indicate that the network device performs scheduling for the multiple transmission units, the scheduling indication information includes multiple scheduling parameters, and at least one of the multiple scheduling parameters comprises a first value and a second value, where the first value corresponds to the $1^{st}$ transmission unit in the multiple transmission units, and the second value corresponds to another transmission unit other than the $1^{st}$ transmission unit in the multiple transmission units; or the first value corresponds to the last transmission unit in the multiple transmission units, and the second value corresponds to another transmission unit other than the last transmission unit in the multiple transmission units.

During actual application, the scheduling indication information may indicate one or more of the foregoing several cases, and a specific selection of the scheduling indication information may be configured by the network device or specified in a protocol. The scheduling indication information may indicate different transmission manners in the transmission units. For example, the scheduling indication information may indicate whether the terminal performs transmission based on an indication of the network device. Alternatively, the scheduling indication information may indicate content of the scheduling parameters in the transmission units, and an indication manner is more direct. In this way, the terminal may determine different transmission manners based on the indication of the scheduling indication information, and further may perform transmission in the multiple transmission units based on the different transmission manners.

In addition, for the multiple transmission units, if transmission manners in the multiple transmission units are consistent, the scheduling parameter in each of the multiple transmission units has a consistent value. Therefore, in this embodiment of this application, the scheduling indication information may indicate that the scheduling parameters have one value instead of having multiple same values, so that signaling overheads are reduced.

Similarly, if transmission manners in some of the multiple transmission units are consistent, the scheduling indication information may indicate that a quantity of values of the scheduling parameters is less than a quantity of the multiple transmission units, so that signaling overheads are reduced.

With reference to the first aspect, in an example implementation of the first aspect, the at least one scheduling parameter is one or more of the following parameters: a time domain resource allocation parameter, a frequency domain resource allocation parameter, code block group (CBG) indication information, and a start symbol parameter.

There are multiple types of scheduling parameters in the transmission units. For the multiple transmission units, even if the transmission manners in the multiple transmission units are different, only some of the scheduling parameter may have different values. Therefore, for different transmission manners, those scheduling parameter having different values in this embodiment of this application may be one or more of the time domain resource allocation parameter, the frequency domain resource allocation parameter, the code block group (CBG) indication information, and the start symbol parameter. The foregoing lists only several of the at least one scheduling parameter, and a type of the at least one scheduling parameter is not limited in this embodiment of this application.

With reference to the first aspect, in an example implementation of the first aspect, the scheduling indication information includes gap indication information used by the network device to perform scheduling for the transmission unit, and the gap indication information is used to indicate at least one gap length.

In this embodiment of this application, the scheduling indication information may include the gap indication information, to reserve a resource for the terminal to perform LBT. In this case, if the network device simultaneously manages multiple terminals, each terminal may perform LBT on a resource corresponding to a length indicated by the gap indication information in the transmission unit, to prevent a terminal from continuously sending data or receiving data, which results in that another terminal cannot send data or receive data in the transmission unit.

With reference to the first aspect, in an example implementation of the first aspect, the scheduling indication information is used to indicate that the network device performs scheduling for the multiple transmission units, where the scheduling indication information includes one piece of gap indication information; or the scheduling indication information includes multiple pieces of gap indication information, where one transmission unit corresponds to one piece of gap indication information, and the gap indication information is used to indicate at least one gap length.

In this embodiment of this application, for the multiple transmission units, if a resource is reserved for the terminal to perform LBT in each transmission unit, the scheduling indication information may include only one piece of gap indication information instead of multiple pieces of gap indication information, so that signaling overheads can be reduced.

With reference to the first aspect, in an example implementation of the first aspect, the scheduling indication information is further used to indicate the terminal to perform LBT in a gap of the transmission unit, or the scheduling indication information is further used to indicate the terminal to perform LBT in gaps of the multiple transmission units.

In this embodiment of this application, a gap may be set in one or more transmission units, to reserve a resource for the terminal to perform LBT, to prevent a terminal from continuously sending data or receiving data, which results in that another terminal cannot send data or receive data in the transmission units.

With reference to the first aspect, in an example implementation of the first aspect, the scheduling indication information is carried in multiple fields in signaling;

the scheduling indication information is carried on different bits in a same field in signaling; or the scheduling indication information is indicated by using a first format of downlink control information (DCI), and the signaling is the DCI and/or radio resource control (RRC) signaling.

In this embodiment of this application, the scheduling indication information may be carried in a field in signaling such as DCI for indication. For example, a DCI field may be newly defined in existing DCI, or a quantity of occupied bits may be redefined for an existing field in the DCI, to indicate a value of a scheduling parameter. Corresponding scheduling indication information has different indication content, so that indication overheads can be reduced as much as possible, and overall system performance can be improved. In addition, the scheduling indication information may be specifically indicated in multiple manners. For example, the scheduling indication information may also be indicated by using a newly defined DCI format. How to indicate the scheduling indication information is not limited in this embodiment of this application.

According to a second aspect, an embodiment of this application provides a resource scheduling method. The method includes:

A terminal receives scheduling indication information from a network device, where the scheduling indication information is used to indicate that the network device performs scheduling for one transmission unit, or the scheduling indication information is used to indicate that the network device performs scheduling for multiple transmission units.

The terminal performs transmission in the transmission unit or the multiple transmission units based on the scheduling indication information.

The method may be performed by a second communication apparatus. The second communication apparatus may be a terminal or a communication apparatus that can support the terminal in implementing a required function of the method. Certainly, the second communication apparatus may alternatively be another communication apparatus, for example, a chip system. Herein, an example in which the second communication apparatus is a terminal is used.

With reference to the second aspect, in an example implementation of the second aspect, the scheduling indication information is further used to indicate the terminal to perform transmission based on a scheduling indication of the network device, or the scheduling indication information is further used to indicate the terminal to perform transmission based on a result of listen before talk (LBT).

With reference to the second aspect, in an example implementation of the second aspect, the scheduling indication information is used to indicate that the network device performs scheduling for the multiple transmission units, and the scheduling indication information includes multiple scheduling parameters, where each of the multiple scheduling parameters includes one value; or at least one of the multiple scheduling parameters includes multiple values, and another parameter other than the at least one scheduling parameter comprises one value.

With reference to the second aspect, in an example implementation of the second aspect, the scheduling indication information is used to indicate that the network device performs scheduling for the multiple transmission units, the scheduling indication information includes multiple scheduling parameters, and at least one of the multiple scheduling parameters comprises a first value and a second value, where the first value corresponds to the $1^{st}$ transmission unit in the multiple transmission units, and the second value corresponds to another transmission unit other than the $1^{st}$ transmission unit in the multiple transmission units; or the first value corresponds to the last transmission unit in the multiple transmission units, and the second value corresponds to another transmission unit other than the last transmission unit in the multiple transmission units.

With reference to the second aspect, in an example implementation of the second aspect, the at least one scheduling parameter is one or more of the following parameters: a time domain resource allocation parameter, a frequency domain resource allocation parameter, code block group (CBG) indication information, and a start symbol parameter.

With reference to the second aspect, in an example implementation of the second aspect, the scheduling indication information includes gap indication information used by the network device to perform scheduling for the transmission unit, and the gap indication information is used to indicate at least one gap length.

With reference to the second aspect, in an example implementation of the second aspect, the scheduling indication information is used to indicate that the network device performs scheduling for the multiple transmission units, where the scheduling indication information includes one piece of gap indication information; or the scheduling indication information includes multiple pieces of gap indication information, where one transmission unit corresponds to one piece of gap indication information, and the gap indication information is used to indicate at least one gap length.

With reference to the second aspect, in an example implementation of the second aspect, the scheduling indication information is further used to indicate the terminal to perform LBT in a gap of the transmission unit, or the scheduling indication information is further used to indicate the terminal to perform LBT in gaps of the multiple transmission units.

With reference to the second aspect, in an example implementation of the second aspect, the scheduling indication information is carried in multiple fields in signaling;

the scheduling indication information is carried on different bits in a same field in signaling; or the scheduling indication information is indicated by using a first format of downlink control information (DCI), and the signaling is the DCI and/or radio resource control (RRC) signaling.

For technical effects achieved by the second aspect or the possible implementations of the second aspect, refer to the descriptions of the technical effects of the first aspect or the possible implementations of the first aspect.

According to a third aspect, a first type of communication apparatus is provided. For example, the communication apparatus is the foregoing first communication apparatus. The communication apparatus is configured to perform the method according to any one of the first aspect or the possible implementations of the first aspect. Specifically, the communication apparatus may include modules configured to perform the method according to any one of the first aspect or the possible implementations of the first aspect, for example, include a processing module and a transceiver module that are coupled to each other. For example, the communication apparatus is a network device.

The processing module is configured to determine scheduling indication information, where the scheduling indication information is used to indicate that the network device performs scheduling for one transmission unit, or the scheduling indication information is used to indicate that the network device performs scheduling for multiple transmission units.

The transceiver module is configured to send the scheduling indication information to a terminal under control of the processing module.

With reference to the third aspect, in an example implementation of the third aspect, the scheduling indication information is further used to indicate the terminal to perform transmission based on a scheduling indication of the network device, or the scheduling indication information is further used to indicate the terminal to perform transmission based on a result of listen before talk (LBT).

With reference to the third aspect, in an example implementation of the third aspect, the scheduling indication information is used to indicate that the network device performs scheduling for the multiple transmission units, and the scheduling indication information includes multiple scheduling parameters, where each of the multiple scheduling parameters includes one value; or at least one of the multiple scheduling parameters includes multiple values, and another parameter other than the at least one scheduling parameter comprises one value.

With reference to the third aspect, in an example implementation of the third aspect, the scheduling indication information is used to indicate that the network device performs scheduling for the multiple transmission units, the scheduling indication information includes multiple scheduling parameters, and at least one of the multiple scheduling parameters comprises a first value and a second value, where the first value corresponds to the $1^{st}$ transmission unit in the multiple transmission units, and the second value corresponds to another transmission unit other than the 1st transmission unit in the multiple transmission units; or the first value corresponds to the last transmission unit in the multiple transmission units, and the second value corresponds to another transmission unit other than the last transmission unit in the multiple transmission units.

With reference to the third aspect, in an example implementation of the third aspect, the at least one scheduling parameter is one or more of the following parameters: a time domain resource allocation parameter, a frequency domain resource allocation parameter, code block group (CBG) indication information, and a start symbol parameter.

With reference to the third aspect, in an example implementation of the third aspect, the scheduling indication information includes gap indication information used by the network device to perform scheduling for the transmission unit, and the gap indication information is used to indicate at least one gap length.

With reference to the third aspect, in an example implementation of the third aspect, the scheduling indication information is used to indicate that the network device performs scheduling for the multiple transmission units, where the scheduling indication information includes one piece of gap indication information; or the scheduling indication information includes multiple pieces of gap indication information, where one transmission unit corresponds to one piece of gap indication information, and the gap indication information is used to indicate at least one gap length.

With reference to the third aspect, in an example implementation of the third aspect, the scheduling indication information is further used to indicate the terminal to perform LBT in a gap of the transmission unit, or the scheduling indication information is further used to indicate the terminal to perform LBT in gaps of the multiple transmission units.

With reference to the third aspect, in an example implementation of the third aspect, the scheduling indication information is carried in multiple fields in signaling;

the scheduling indication information is carried on different bits in a same field in signaling; or the scheduling indication information is indicated by using a first format of downlink control information (DCI), and the signaling is the DCI and/or radio resource control (RRC) signaling.

For technical effects achieved by the third aspect or the possible implementations of the third aspect, refer to the descriptions of the technical effects of the first aspect or the possible implementations of the first aspect.

According to a fourth aspect, a second type of communication apparatus is provided. For example, the communication apparatus is the foregoing second communication apparatus. The communication apparatus is configured to perform the method according to any one of the second aspect or the possible implementations of the second aspect. Specifically, the communication apparatus may include modules configured to perform the method according to any one of the second aspect or the possible implementations of the second aspect, for example, include a processing module and a transceiver module that are coupled to each other. For example, the communication apparatus is a terminal.

The transceiver module is configured to receive scheduling indication information from a network device, where the scheduling indication information is used to indicate that the network device performs scheduling for one transmission unit, or the scheduling indication information is used to indicate that the network device performs scheduling for multiple transmission units.

The processing module is configured to perform transmission in the transmission unit or the multiple transmission units based on the scheduling indication information.

With reference to the fourth aspect, in an example implementation of the fourth aspect, the scheduling indication information is further used to indicate the terminal to perform transmission based on a scheduling indication of the network device, or the scheduling indication information is further used to indicate the terminal to perform transmission based on a result of listen before talk (LBT).

With reference to the fourth aspect, in an example implementation of the fourth aspect, the scheduling indication information is used to indicate that the network device performs scheduling for the multiple transmission units, and the scheduling indication information includes multiple scheduling parameters, where each of the multiple scheduling parameters includes one value; or at least one of the multiple scheduling parameters includes multiple values, and another parameter other than the at least one scheduling parameter comprises one value.

With reference to the fourth aspect, in an example implementation of the fourth aspect, the scheduling indication information is used to indicate that the network device performs scheduling for the multiple transmission units, the scheduling indication information includes multiple scheduling parameters, and at least one of the multiple scheduling parameters comprises a first value and a second value, where the first value corresponds to the 1st transmission unit in the multiple transmission units, and the second value corresponds to another transmission unit other than the 1st transmission unit in the multiple transmission units; or the first value corresponds to the last transmission unit in the multiple transmission units, and the second value corresponds to another transmission unit other than the last transmission unit in the multiple transmission units.

With reference to the fourth aspect, in an example implementation of the fourth aspect, the at least one scheduling parameter is one or more of the following parameters: a time domain resource allocation parameter, a frequency domain resource allocation parameter, code block group (CBG) indication information, and a start symbol parameter.

With reference to the fourth aspect, in an example implementation of the fourth aspect, the scheduling indication information includes gap indication information used by the network device to perform scheduling for the transmission unit, and the gap indication information is used to indicate at least one gap length.

With reference to the fourth aspect, in an example implementation of the fourth aspect, the scheduling indication information is used to indicate that the network device performs scheduling for the multiple transmission units, where the scheduling indication information includes one piece of gap indication information; or the scheduling indication information includes multiple pieces of gap indication information, where one transmission unit corresponds to one piece of gap indication information, and the gap indication information is used to indicate at least one gap length.

With reference to the fourth aspect, in an example implementation of the fourth aspect, the scheduling indication information is further used to indicate the terminal to perform LBT in a gap of the transmission unit, or the scheduling indication information is further used to indicate the terminal to perform LBT in gaps of the multiple transmission units.

With reference to the fourth aspect, in an example implementation of the fourth aspect, the scheduling indication information is carried in multiple fields in signaling;

the scheduling indication information is carried on different bits in a same field in signaling; or the scheduling indication information is indicated by using a first format of downlink control information (DCI), and the signaling is the DCI and/or radio resource control (RRC) signaling.

For technical effects achieved by the fourth aspect or the possible implementations of the fourth aspect, refer to the descriptions of the technical effects of the second aspect or the possible implementations of the second aspect.

According to a fifth aspect, a third type of communication apparatus is provided. The communication apparatus is, for example, the foregoing first communication apparatus. The communication apparatus includes a processor and a transceiver, configured to implement the method according to any one of the first aspect or the example embodiments of the first aspect. For example, the communication apparatus is a chip disposed in a communication device. For example, the communication device is a network device. For example, the transceiver is implemented by using an antenna, a feeder, and a codec in the communication device. Alternatively, if the communication apparatus is a chip disposed in a communication device, the transceiver is, for example, a communication interface in the chip. The communication interface is connected to a radio frequency transceiver component in the communication device, to receive and send information by using the radio frequency transceiver component.

The processor is configured to determine scheduling indication information, where the scheduling indication information is used to indicate that the network device performs scheduling for one transmission unit, or the scheduling indication information is used to indicate that the network device performs scheduling for multiple transmission units.

The transceiver is configured to send the scheduling indication information to a terminal under control of the processor.

With reference to the fifth aspect, in an example implementation of the fifth aspect, the scheduling indication information is further used to indicate the terminal to perform transmission based on a scheduling indication of the network device, or the scheduling indication information is further used to indicate the terminal to perform transmission based on a result of listen before talk (LBT).

With reference to the fifth aspect, in an example implementation of the fifth aspect, the scheduling indication information is used to indicate that the network device performs scheduling for the multiple transmission units, and the scheduling indication information includes multiple scheduling parameters, where each of the multiple scheduling parameters includes one value; or at least one of the multiple scheduling parameters includes multiple values, and another parameter other than the at least one scheduling parameter comprises one value.

With reference to the fifth aspect, in an example implementation of the fifth aspect, the scheduling indication information is used to indicate that the network device performs scheduling for the multiple transmission units, the scheduling indication information includes multiple scheduling parameters, and at least one of the multiple scheduling parameters comprises a first value and a second value, where the first value corresponds to the 1st transmission unit in the multiple transmission units, and the second value corresponds to another transmission unit other than the 1st transmission unit in the multiple transmission units; or the first value corresponds to the last transmission unit in the multiple transmission units, and the second value corresponds to another transmission unit other than the last transmission unit in the multiple transmission units.

With reference to the fifth aspect, in an example implementation of the fifth aspect, the at least one scheduling parameter is one or more of the following parameters: a time domain resource allocation parameter, a frequency domain resource allocation parameter, code block group (CBG) indication information, and a start symbol parameter.

With reference to the fifth aspect, in an example implementation of the fifth aspect, the scheduling indication information includes gap indication information used by the network device to perform scheduling for the transmission unit, and the gap indication information is used to indicate at least one gap length.

With reference to the fifth aspect, in an example implementation of the fifth aspect, the scheduling indication information is used to indicate that the network device performs scheduling for the multiple transmission units, where the scheduling indication information includes one piece of gap indication information; or the scheduling indication information includes multiple pieces of gap indication information, where one transmission unit corresponds to one piece of gap indication information, and the gap indication information is used to indicate at least one gap length.

With reference to the fifth aspect, in an example implementation of the fifth aspect, the scheduling indication information is further used to indicate the terminal to perform LBT in a gap of the transmission unit, or the scheduling indication information is further used to indicate the terminal to perform LBT in gaps of the multiple transmission units.

With reference to the fifth aspect, in an example implementation of the fifth aspect, the scheduling indication information is carried in multiple fields in signaling;

the scheduling indication information is carried on different bits in a same field in signaling; or the scheduling indication information is indicated by using a first format of downlink control information (DCI), and the signaling is the DCI and/or radio resource control (RRC) signaling.

For technical effects achieved by the fifth aspect or the possible implementations of the fifth aspect, refer to the descriptions of the technical effects of the first aspect or the possible implementations of the first aspect.

According to a sixth aspect, a fourth type of communication apparatus is provided. The communication apparatus is, for example, the foregoing second communication apparatus. The communication apparatus includes a processor and a transceiver, configured to implement the method according to any one of the second aspect or the example embodiments of the second aspect. For example, the communication apparatus is a chip disposed in a communication device. For example, the communication device is a terminal. For example, the transceiver is implemented by using an antenna, a feeder, and a codec in the communication device. Alternatively, if the communication apparatus is a chip disposed in a communication device, the transceiver is, for example, a communication interface in the chip. The communication interface is connected to a radio frequency transceiver component in the communication device, to receive and send information by using the radio frequency transceiver component.

The transceiver is configured to receive scheduling indication information from a network device, where the scheduling indication information is used to indicate that the network device performs scheduling for one transmission unit, or the scheduling indication information is used to indicate that the network device performs scheduling for multiple transmission units.

The processor is configured to perform transmission in the transmission unit or the multiple transmission units based on the scheduling indication information.

With reference to the sixth aspect, in an example embodiment of the sixth aspect, the scheduling indication information is further used to indicate the terminal to perform transmission based on a scheduling indication of the network device, or the scheduling indication information is further used to indicate the terminal to perform transmission based on a result of listen before talk (LBT).

With reference to the sixth aspect, in an example implementation of the sixth aspect, the scheduling indication information is used to indicate that the network device performs scheduling for the multiple transmission units, and the scheduling indication information includes multiple scheduling parameters, where

- each of the multiple scheduling parameters includes one value; or
- at least one of the multiple scheduling parameters includes multiple values, and another parameter other than the at least one scheduling parameter comprises one value.

With reference to the sixth aspect, in an example implementation of the sixth aspect, the scheduling indication information is used to indicate that the network device performs scheduling for the multiple transmission units, the scheduling indication information includes multiple scheduling parameters, and at least one of the multiple scheduling parameters comprises a first value and a second value, where

- the first value corresponds to the $1^{st}$ transmission unit in the multiple transmission units, and the second value corresponds to another transmission unit other than the $1^{st}$ transmission unit in the multiple transmission units; or
- the first value corresponds to the last transmission unit in the multiple transmission units, and the second value corresponds to another transmission unit other than the last transmission unit in the multiple transmission units.

With reference to the sixth aspect, in an example implementation of the sixth aspect, the at least one scheduling parameter is one or more of the following parameters: a time domain resource allocation parameter, a frequency domain resource allocation parameter, code block group (CBG) indication information, and a start symbol parameter.

With reference to the sixth aspect, in an example implementation of the sixth aspect, the scheduling indication information includes gap indication information used by the network device to perform scheduling for the transmission unit, and the gap indication information is used to indicate at least one gap length.

With reference to the sixth aspect, in an example implementation of the sixth aspect, the scheduling indication information is used to indicate that the network device performs scheduling for the multiple transmission units, where

- the scheduling indication information includes one piece of gap indication information; or
- the scheduling indication information includes multiple pieces of gap indication information, where one transmission unit corresponds to one piece of gap indication information, and the gap indication information is used to indicate at least one gap length.

With reference to the sixth aspect, in an example implementation of the sixth aspect, the scheduling indication information is further used to indicate the terminal to perform LBT in a gap of the transmission unit, or the scheduling indication information is further used to indicate the terminal to perform LBT in gaps of the multiple transmission units.

With reference to the sixth aspect, in an example implementation of the sixth aspect, the scheduling indication information is carried in multiple fields in signaling;

- the scheduling indication information is carried on different bits in a same field in signaling; or
- the scheduling indication information is indicated by using a first format of downlink control information (DCI), and the signaling is the DCI and/or radio resource control (RRC) signaling.

For technical effects achieved by the sixth aspect or the possible implementations of the sixth aspect, refer to the descriptions of the technical effects of the second aspect or the possible implementations of the second aspect.

According to a seventh aspect, a fifth type of communication apparatus is provided. The communication apparatus may be the first communication apparatus in the foregoing method embodiments. For example, the communication apparatus is a chip disposed in a network device. The communication apparatus includes: a memory, configured to store computer-executable program code; and a processor, where the processor is coupled to the memory. The program code stored in the memory includes instructions. When the processor executes the instructions, the fifth type of communication apparatus is enabled to perform the method according to any one of the first aspect or the possible implementations of the first aspect.

The fifth type of communication apparatus may further include a communication interface. The communication interface may be a transceiver in the network device, and is implemented by using, for example, an antenna, a feeder, and a codec in the communication apparatus. Alternatively, if the fifth type of communication apparatus is a chip disposed in the network device, the communication interface may be an input/output interface of the chip, for example, an input/output pin.

According to an eighth aspect, a sixth type of communication apparatus is provided. The communication apparatus may be the second communication apparatus in the foregoing method embodiments. For example, the communication apparatus is a chip disposed in a terminal. The communication apparatus includes: a memory, configured to store computer-executable program code; and a processor, where the processor is coupled to the memory. The program code stored in the memory includes instructions. When the processor executes the instructions, the sixth type of communication apparatus is enabled to perform the method according to any one of the second aspect or the possible implementations of the second aspect.

The sixth type of communication apparatus may further include a communication interface. The communication interface may be a transceiver in the terminal, and is implemented by using, for example, an antenna, a feeder, and a codec in the communication apparatus. Alternatively, if the sixth type of communication apparatus is a chip disposed in the terminal, the communication interface may be an input/output interface of the chip, for example, an input/output pin.

According to a ninth aspect, a communication system is provided. The communication system may include the first type of communication apparatus according to the third aspect, the third type of communication apparatus according to the fifth aspect, or the fifth type of communication apparatus according to the seventh aspect, and include the second type of communication apparatus according to the fourth aspect, the fourth type of communication apparatus according to the sixth aspect, or the sixth type of communication apparatus according to the eighth aspect.

According to a tenth aspect, a computer-readable storage medium is provided. The computer-readable storage medium stores instructions. When the instructions are run on a computer, the computer is enabled to perform the method according to any one of the first aspect or the example embodiments of the first aspect.

According to an eleventh aspect, a computer-readable storage medium is provided. The computer-readable storage medium stores instructions. When the instructions are run on a computer, the computer is enabled to perform the method according to any one of the second aspect or the example embodiments of the second aspect.

According to a twelfth aspect, a computer program product including instructions is provided. The computer program product stores the instructions. When the computer program product runs on a computer, the computer is enabled to perform the method according to any one of the first aspect or the example embodiments of the first aspect.

According to a thirteenth aspect, a computer program product including instructions is provided. The computer program product stores the instructions. When the computer program product runs on a computer, the computer is enabled to perform the method according to any one of the second aspect or the example embodiments of the second aspect.

In the embodiments of this application, the scheduling indication information may indicate that a scheduled transmission unit is one transmission unit or multiple transmission units, to explicitly a manner in which the terminal simultaneously performs scheduling for the multiple transmission units when there are the multiple transmission units. This helps reduce overheads of performing LBT by the terminal for the multiple transmission units.

DESCRIPTION OF EMBODIMENTS

Figure 1:
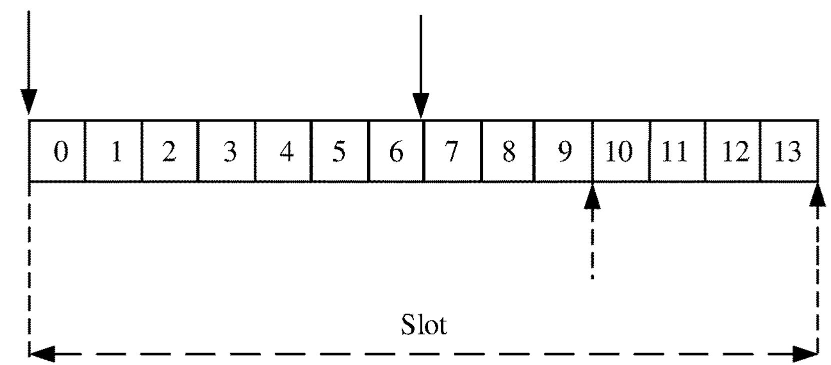
FIG. 1 is a schematic diagram of scheduling for multiple transmission units according to an embodiment of this application.

To make objectives, technical solutions, and advantages of embodiments of this application clearer, the following further describes the embodiments of this application in detail with reference to the accompanying drawings.

The following describes some terms in the embodiments of this application, to facilitate understanding of a person skilled in the art.

(1) A terminal, also referred to as a terminal device, user equipment (UE), a mobile station (MS), a mobile terminal (MT), or the like, is a device that provides a user with voice and/or data connectivity, and may include, for example, a handheld device having a wireless connection function, or another processing device connected to a wireless modem. The terminal may communicate with a core network by using a radio access network (RAN), and exchange voice and/or data with the RAN. The terminal may include user equipment (UE), a wireless terminal, a mobile terminal, a subscriber unit, a subscriber station, a mobile station, a remote station, an access point (AP), a remote terminal, an access terminal, a user terminal, a user agent, a user device, or the like. The terminal may include, for example, a mobile phone (or referred to as a "cellular" phone), a computer with a mobile terminal, a portable, pocket-sized, handheld, computer built-in, or vehicle-mounted mobile apparatus, or a smart wearable device. For example, the terminal is a device such as a personal communications service (PCS) phone, a cordless phone, a session initiation protocol (SIP) phone, a wireless local loop (WLL) station, or a personal digital assistant (PDA). The terminal further includes a limited device, such as a device having low power consumption, a device having a limited storage capability, or a device having a limited computing capability. For example, the terminal includes an information sensing device, such as a barcode, radio frequency identification (RFID), a sensor, a global positioning system (GPS), or a laser scanner.

As an example instead of a limitation, in the embodiments of this application, the terminal may alternatively be a wearable device. The wearable device may also be referred to as a wearable intelligent device, and is a general term for wearable devices such as glasses, gloves, watches, clothes, and shoes that are developed by applying wearable technologies in intelligent designs of daily wear. The wearable device is a portable device that is directly worn on a body or integrated into clothes or an accessory of a user. The wearable device is not only a hardware device, but also implements a powerful function through software support, data exchange, and cloud interaction. In a broad sense, the wearable intelligent device includes full-featured and large-sized devices that can implement all or some functions without depending on smartphones, for example, smart watches or smart glasses, and devices that focus on only one type of application function and need to work with other devices such as smartphones, for example, various smart bands, smart helmets, or smart jewelry for monitoring physical signs. The terminal may alternatively be a virtual reality (VR) device, an augmented reality (AR) device, a wireless terminal in industrial control, a wireless terminal in self driving, a wireless terminal in remote medical surgery, a wireless terminal in a smart grid, a wireless terminal in transportation safety, a wireless terminal in a smart city, a wireless terminal in a smart home, or the like.

However, if the various terminals described above are located on a vehicle (for example, placed inside the vehicle or mounted inside the vehicle), the terminals may be considered as vehicle-mounted terminals. For example, the vehicle-mounted terminal is also referred to as an on-board unit (OBU). In the embodiments of this application, the terminal may further include a relay. Alternatively, it may be understood that any device that can perform data communication with a base station may be considered as a terminal.

(2) A network device includes, for example, an access network (AN) device such as a base station (for example, an access point), and may be a device that is in an access network and that communicates with a wireless terminal over an air interface by using one or more cells. Alternatively, for example, a network device in a V2X technology is a road side unit (RSU). The RSU may be a fixed infrastructure entity supporting application of the V2X, and may exchange a message with another entity supporting application of the V2X. The network device may be configured to: mutually convert a received over-the-air frame and an internet protocol (IP) packet, and serve as a router between the terminal and a rest portion of the access network, where the rest portion of the access network may include an IP network. The network device may further coordinate attribute management of the air interface. For example, the network device may include a radio network controller (RNC), a NodeB (NB), a base station controller (BSC), a base transceiver station (BTS), a home base station (for example, a home evolved NodeB or a home NodeB, HNB), a baseband unit (BBU), a wireless fidelity (Wi-Fi) access point (AP), or the like, may include an evolved base station (NodeB, eNB, or e-NodeB, evolved NodeB) in a long term evolution (LTE) system or a long term evolution (LTE)-advanced (LTE-Advanced, LTE-A) system, may include a next generation NodeB (gNB) in a fifth generation mobile communication technology (5G) new radio (NR) system, or may include a centralized unit (CU) and a distributed unit (DU) in a cloud radio access network (cloud RAN) system. This is not limited in the embodiments of this application.

(3) Time-frequency resource. A time-frequency resource in a wireless communication system is usually described in a unit of a physical resource block (PRB) or an RB. One PRB includes two slots in time domain, namely, 14 orthogonal frequency division multiplexing (OFDM) symbols, and includes 12 subcarriers in frequency domain. One PRB includes two adjacent RBs, that is, one RB includes 12 subcarriers in frequency domain and includes one slot in time domain. It should be noted that terms “time-frequency resource” and “resource” in the embodiments of this application may be used interchangeably.

(4) A transmission unit is a time unit. For example, the transmission unit may be one slot, one subframe, one mini-slot, one orthogonal frequency division multiplexing (OFDM) symbol, one millisecond (ms), or one fractional millisecond (for example, 1/32 ms). Alternatively, the transmission unit may include multiple slots, multiple subframes, multiple mini-slots, multiple OFDM symbols, several milliseconds, or several fractional milliseconds. The mini-slot is a concept newly used in new radio (NR). If a length of data symbols scheduled by a network device is less than a slot, the data of the length is referred to as a mini-slot. The mini-slot occupies shorter time, and is more suitable for transmission of data with a low latency requirement.

In a long term evolution (LTE) system, a minimum time scheduling unit is a transmission time interval (TTI) with a time length of 1 ms. In the NR system, a shorter time scheduling unit may be used for data transmission. For example, a mini-slot or a slot having a larger subcarrier spacing is used as the minimum time scheduling unit. One mini-slot includes one or more time domain symbols. The time domain symbol herein may be an OFDM symbol. For a slot with a subcarrier spacing of 15 kilohertz (kHz), six or seven time domain symbols are included, and a corresponding time length is 0.5 ms; for a slot with a subcarrier spacing of 60 kHz, a corresponding time length is shortened to 0.125 ms.

The network device may perform scheduling for one transmission unit, or may perform scheduling for multiple transmission units. Scheduling for one transmission unit in the embodiments of this application refers to scheduling for one subframe, scheduling for one TTI, scheduling for one slot, scheduling for one mini-slot, scheduling for one symbol, or the like. Scheduling for multiple transmission units in the embodiments of this application refers to scheduling for multiple subframes, scheduling for multiple TTIs, scheduling for multiple slots, scheduling for multiple mini-slots, scheduling for multiple symbols, or the like.

One transmission unit may include one transmission starting point or multiple transmission starting points, or may include one transmission ending point or multiple transmission ending points. It should be noted that the transmission starting point herein refers to a starting point of data transmission or signaling transmission, namely, a starting position of the data transmission or signaling transmission. The transmission ending point refers to an ending point of data transmission or signaling transmission, namely, an ending position of the data transmission or signaling transmission. In other words, one transmission may start from a start symbol of a transmission unit, or may start from any symbol other than the start symbol of the transmission unit; or the transmission may end at an end symbol of a transmission unit, or may end at any symbol other than the end symbol of the transmission unit. For example, refer to FIG. 1. For example, one transmission unit is one slot, and the transmission unit includes 14 OFDM symbols in total, from 0 to 13 shown in FIG. 1. When the transmission unit has multiple transmission starting points, during transmission, a terminal may start transmission by using the symbol 0 shown in FIG. 1 as a transmission starting point (shown by a solid arrow in FIG. 1), or may start transmission by using the symbol 7 shown in FIG. 1 as a transmission starting point. Similarly, for multiple transmission ending points, during transmission, the terminal may end transmission by using the symbol 9 shown in FIG. 1 as a transmission ending point (shown by a dotted arrow in FIG. 1), or may end transmission by using the symbol 13 shown in FIG. 1 as a transmission ending point. It can be learned from FIG. 1 that, when transmission is performed by using the symbol 7 as a transmission starting point, a corresponding actual transmission length is less than a length of one slot, and is also referred to as a partial slot. In some embodiments, the transmission starting point may also be referred to as a transmission start symbol, and the transmission ending point may also be referred to as a transmission end symbol.

In this embodiment, one transport block (TB) is transmitted in one transmission unit. In another embodiment, multiple TBs may be transmitted in one transmission unit, or a part of a TB is transmitted in one transmission unit and a remaining part is transmitted in another transmission unit, that is, one TB is transmitted across multiple transmission units.

In the embodiments of this application, scheduling for multiple transmission units may also be understood as that a network device performs scheduling for multiple transmission units in which a terminal performs sending or receiving. Each of the multiple transmission units used for scheduling may have one transmission starting point or multiple transmission starting points; and/or each transmission unit comprises one transmission ending point or multiple transmission ending points; or the network device performs scheduling for a part that is of each transmission unit and in which the terminal performs sending or receiving, so that an actual length of transmission by the terminal is less than or equal to a length of the transmission unit.

(5) The term “multiple” in the embodiments of this application means two or more than two. In view of this, “multiple” in the embodiments of this application may also be understood as “at least two”. “At least one” may be understood as one or more, for example, understood as one, two, or more. For example, including at least one means including one, two, or more, and does not limit which is included. For example, including at least one of A, B, and C may represent the following cases: A is included, B is included, C is included, A and B are included, A and C are included, B and C are included, or A, B, and C are included. “And/or” describes an association relationship between associated objects and represents that three relationships may exist. For example, A and/or B may represent the following three cases: Only A exists, both A and B exist, and only B exists. In addition, unless otherwise specified, the character “/” usually indicates an “or” relationship between the associated objects. The terms “system” and “network” may be used interchangeably in the embodiments of this application.

Unless otherwise stated, ordinal numbers such as “first” and “second” in the embodiments of this application are used to distinguish between multiple objects, but are not intended to limit a sequence, a time sequence, priorities, or importance of the multiple objects.

The foregoing describes some concepts in the embodiments of this application. The following describes technical features in the embodiments of this application.

Scheduling for a transmission unit usually means that multiple terminals share a channel, and a network device allocates a resource of the shared channel in each scheduling periodicity and notifies the terminals of the allocated resource. Channels that need to be scheduled include a physical downlink shared channel (PDSCH) and a physical uplink shared channel (PUSCH). The network device usually sends, to the terminals, scheduling indication information indicating the transmission unit, and then the terminals send data or receive data in the transmission unit based on the scheduling indication information.

In a 5G system, for scheduling for a transmission unit, information indicated in scheduling signaling sent by the network device may be for a single transmission unit. However, the 5G system supports use of an unlicensed spectrum resource, that is, multiple terminals may share a same spectrum resource. To ensure a principle of fairness, when using a time-frequency resource in an unlicensed frequency band, the multiple terminals need to perform LBT first, to use the time-frequency resource only when it is determined that the time-frequency resource is idle. For scheduling for multiple transmission units, if current scheduling for a single transmission unit is still used, that is, scheduling is performed separately for multiple transmission units, the terminals need to perform LBT detection for all the transmission units. Consequently, LBT overheads are large.

In view of this, the technical solutions in the embodiments of this application are provided. In the embodiments of this application, the network device may indicate, by using scheduling indication information, whether a scheduled transmission unit is one transmission unit or multiple transmission units. It can be learned that, according to the method provided in the embodiments of this application, when there are multiple transmission units, a manner in which the terminal simultaneously performs scheduling for the multiple transmission units may be explicitly indicated. In addition, this helps reduce overheads of performing LBT by the terminal for the multiple transmission units.

The technical solutions provided in the embodiments of this application may be used in a 5G system, for example, an NR system, or may be used in a next generation mobile communication system of 5G or another similar communication system. This is not specifically limited.

Figure 2:
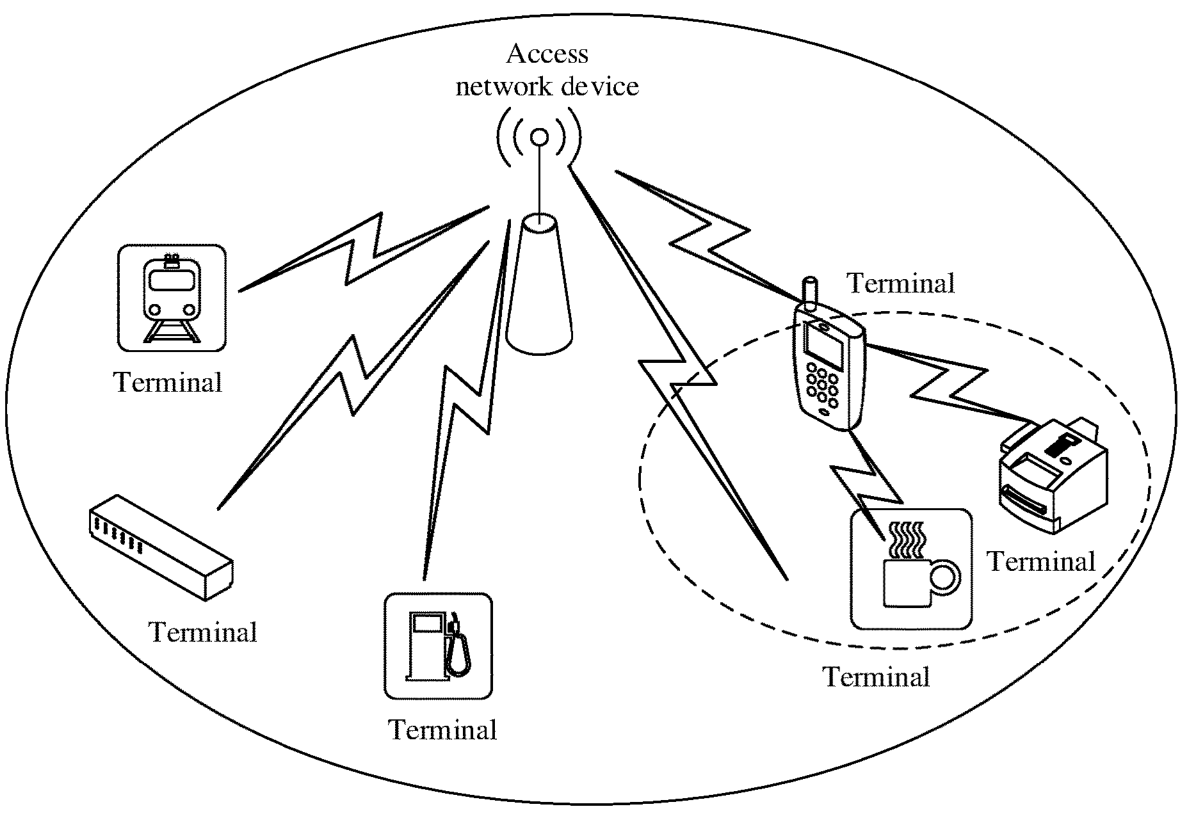
FIG. 2 is a schematic diagram of a network architecture according to an embodiment of this application.

The following describes a network architecture used in an embodiment of this application. Refer to FIG. 2.

In FIG. 2, an access network device and six terminals are included. A quantity of the terminals in FIG. 2 is merely an example, and there may alternatively be more or less terminals. FIG. 2 is merely a schematic diagram, and the network architecture may further include another network device, for example, may further include a wireless relay device and a wireless backhaul device that are not drawn in FIG. 2.

The access network device is an access device through which a terminal is connected to the mobile communication system in a wireless manner, and may be a base station NodeB, an evolved base station eNodeB, a base station in a 5G communication system, a base station in a future mobile communication system, an access node in a wireless fidelity (Wi-Fi) system, or the like. A specific technology and a specific device form used by the access network device are not limited in the embodiments of this application.

The terminal may also be referred to as a terminal device. For example, the terminal may be a cellular phone, a smartphone, a portable computer, a handheld communication device, a handheld computing device, a satellite radio apparatus, a global positioning system, a PDA, and/or any other suitable device configured to perform communication in the wireless communication system, and all the devices may be connected to the access network device.

The access network device and the terminals may be deployed on land, including indoor or outdoor and handheld or vehicle-mounted devices and terminals, or may be deployed on water, or may be deployed on an airplane, a balloon, or a satellite in the air. Application scenarios of the access network device and the terminals are not limited in the embodiments of this application.

The embodiments of this application are applicable to downlink signal transmission, uplink signal transmission, and device-to-device (D2D) signal transmission. For downlink signal transmission, a sending device is the access network device, and a corresponding receiving device is a terminal. For uplink signal transmission, a sending device is a terminal, and a corresponding receiving device is the access network device. For D2D signal transmission, a sending device is a terminal, and a corresponding receiving device is also a terminal. For example, the three terminals shown in the dotted line area in FIG. 2 is applicable to D2D signal transmission. A signal transmission direction is not limited in the embodiments of this application. In the following descriptions, an example in which embodiments of this application are applicable to uplink signal transmission performed by the terminal, and downlink signal transmission is similar.

In an example, communication may be performed between an access network device and a terminal and between terminals by using a licensed spectrum, by using an unlicensed spectrum, or by using both a licensed spectrum and an unlicensed spectrum. Communication between the access network device and the terminal and between the terminals may be performed by using a spectrum below 6G, may be performed by using a spectrum above 6G, or may be performed by using both a spectrum below 6G and a spectrum above 6G. A spectrum resource used between the access network device and the terminal is not limited in the embodiments of this application.

With reference to the accompanying drawings, the following describes the technical solutions provided in the embodiments of this application.

Figure 3:
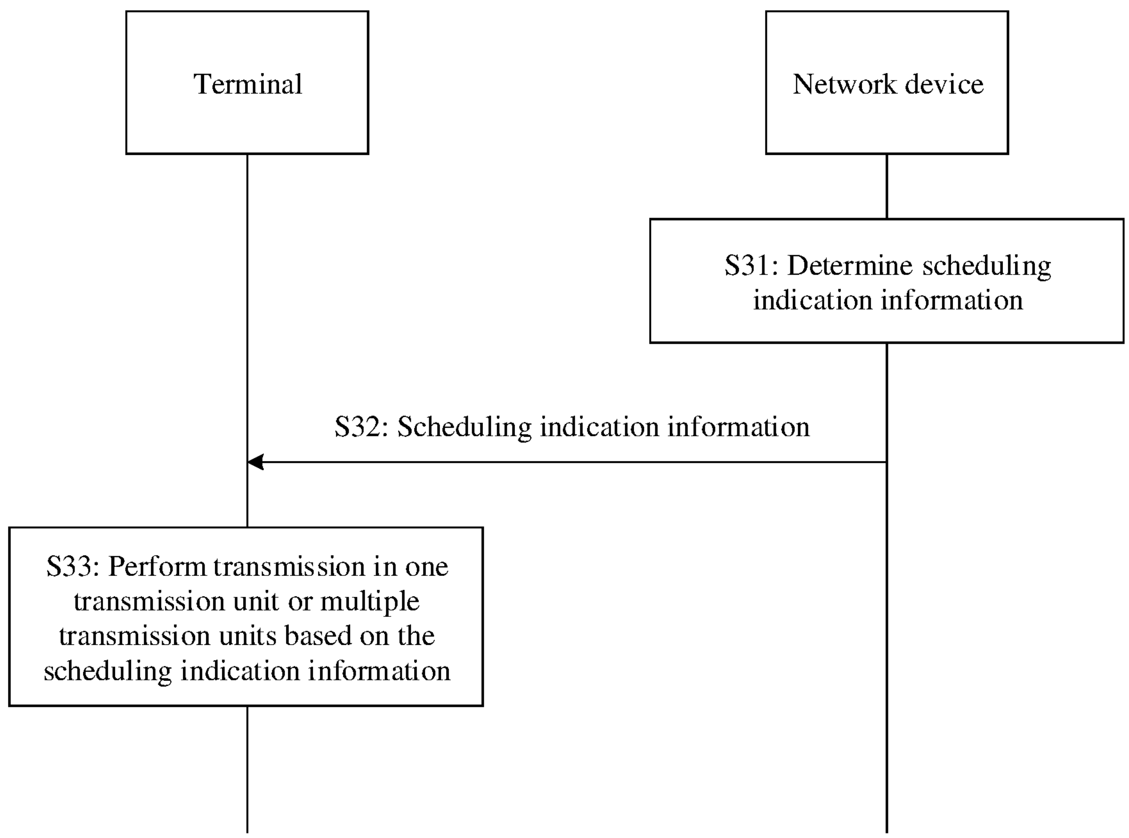
FIG. 3 is a schematic flowchart of a resource scheduling method according to an embodiment of this application.

An embodiment of this application provides a first resource scheduling method. FIG. 3 is a flowchart of this method. The method may be performed by two communication apparatuses. The two communication apparatuses are, for example, a first communication apparatus and a second communication apparatus. The first communication apparatus may be a network device or a communication apparatus that can support a network device in implementing a required function of the method, or may be a terminal or a communication apparatus that can support a terminal in implementing a required function of the method. Certainly, the first communication apparatus may alternatively be another communication apparatus, for example, a chip system. Similarly, the second communication apparatus may be a network device or a communication apparatus that can support a network device in implementing a required function of the method, or may be a terminal or a communication apparatus that can support a terminal in implementing a required function of the method. Certainly, the second communication apparatus may alternatively be another communication apparatus, for example, a chip system. In addition, implementations of both the first communication apparatus and the second communication apparatus are not limited. For example, the first communication apparatus is a network device, and the second communication apparatus is a terminal; both the first communication apparatus and the second communication apparatus are terminals; or the first communication apparatus is a network device, and the second communication apparatus is a communication apparatus that can support a terminal in implementing a required function of the method. For example, the network device is a base station.

For ease of description, the following uses an example in which the method is performed by a network device and a terminal, that is, uses an example in which the first communication apparatus is a network device and the second communication apparatus is a terminal. For example, this embodiment is applied to the network architecture shown in FIG. 2. Therefore, in the following descriptions, the network device may be the access network device in the network architecture shown in FIG. 2, and the terminal may be a terminal in the network architecture shown in FIG. 2.

S31: The network device determines scheduling indication information, where the scheduling indication information is used to indicate that the network device performs scheduling for one transmission unit, or the scheduling indication information is used to indicate that the network device performs scheduling for multiple transmission units.

S32: The network device sends the scheduling indication information to the terminal.

S33: The terminal receives the scheduling indication information from the network device, and performs transmission in the transmission unit or the multiple transmission units based on the scheduling indication information. The transmission may be data transmission or signaling transmission.

In this embodiment of this application, in addition to scheduling for a single transmission unit, scheduling for multiple transmission units is also supported. Therefore, when notifying the terminal of scheduling for a transmission unit, the network device needs to notify the terminal that the network device performs scheduling for one transmission unit or performs scheduling for multiple transmission units.

Specifically, the network device may notify, by using the scheduling indication information, the terminal that the network device performs scheduling for one transmission unit or performs scheduling for multiple transmission units. The scheduling indication information may be used to indicate that the network device performs scheduling for one transmission unit, or the scheduling indication information may be used to indicate that the network device performs scheduling for multiple transmission units.

The scheduling indication information may be carried in downlink control information (DCI) or radio resource control (RRC) signaling, or the scheduling indication information may be indicated in a DCI format, for example, DCI format 0_0, DCI format 0_1, DCI format 1_0, and DCI format 1_1 that are defined for a current NR system, or a DCI format newly defined for a system. For ease of description, in this embodiment of this application, the DCI format newly defined for the system is referred to as a first DCI format. That is, the first DCI format is a format different from DCI format 0_0, DCI format 0_1, DCI format 1_0, and DCI format 1_1.

In an implementation of the scheduling indication information, the scheduling indication information may be carried in a field in the DCI. For ease of description, in this embodiment of this application, the field is referred to as a first field. The first field may be a defined field in the DCI or a newly defined field in the DCI. The first field may occupy 1 bit. When a value of the first field is "0", it may indicate that the network device performs scheduling for one transmission unit; when the value of the first field is “1”, it may indicate that the network device performs scheduling for multiple transmission units. In another embodiment, when a value of the first field is “1”, it may indicate that the network device performs scheduling for multiple transmission units; when the value of the first field is “0”, it may indicate that the network device performs scheduling for one transmission unit. It should be noted that in the embodiments of this application, the value of the first field may also be understood as a value carried in the first field in some embodiments.

In some embodiments, scheduling performed by the network device for one transmission unit and scheduling performed by the network device for multiple transmission units may be considered as different scheduling modes. It may be understood that the scheduling performed by the network device for one transmission unit is a first scheduling mode, and the scheduling performed by the network device for multiple transmission units is a second scheduling mode. In this case, the scheduling indication information may be used to indicate the first scheduling mode or the second scheduling mode. For example, when the value of the first field in the DCI is “0”, the scheduling indication information is used to indicate that the network device performs scheduling in the first scheduling mode; when the value of the first field in the DCI is “1”, the scheduling indication information is used to indicate that the network device performs scheduling in the second scheduling mode. Alternatively, when the value of the first field in the DCI is “1”, the scheduling indication information is used to indicate that the network device performs scheduling in the first scheduling mode; when the value of the first field in the DCI is “0”, the scheduling indication information is used to indicate that the network device performs scheduling in the second scheduling mode.

In a possible implementation, that the first field carries the scheduling indication information may include the following several implementations.

(1) First Implementation:

The first field may be a newly defined field in the DCI. For example, the first field is a field indicating a scheduling mode for a transmission unit, and may be referred to as, for example, an “indication of MODE” field or an “Identifier for multi-TTI scheduling” field. In this embodiment, the first field may occupy 1 bit, and is used to indicate the first scheduling mode or the second scheduling mode.

(2) Second Implementation:

The first field may reuse an existing field in the DCI. For example, the first field may be an “Identifier for DCI formats” field already defined in the DCI, and the “Identifier for DCI formats” field is reused to indicate a scheduling mode for a transmission unit. In this implementation, the “Identifier for DCI formats” field occupies at least 1 bit. If the “Identifier for DCI formats” field occupies 1 bit, the first scheduling mode or the second scheduling mode may be implicitly indicated. If the “Identifier for DCI formats” field occupies multiple bits, at least one of the multiple bits may indicate the first scheduling mode or the second scheduling mode, and a bit other than the at least one bit in the multiple bits may be used to indicate information currently carried in the “Identifier for DCI formats” field, that is, explicitly indicate the first scheduling mode or the second scheduling mode.

In some embodiments, a newly defined DCI format may indicate the scheduling indication information. For example, a DCI format A and a DCI format B are newly defined for a system. The DCI format A is used to indicate the first scheduling mode, and the DCI format B is used to indicate the second scheduling mode.

The terminal may use a time domain resource in an unlicensed frequency band. In this case, the terminal may perform transmission for a transmission unit based on a scheduling indication of the network device, or may perform transmission for a transmission unit based on a result of LBT obtained by performing LBT, to meet an actual transmission requirement as much as possible.

In this case, the scheduling indication information is further used to indicate the terminal to perform transmission based on the scheduling indication of the network device. Alternatively, the scheduling indication information is used to indicate the terminal to perform transmission based on the result of the LBT. Similarly, it may be considered that the network device has different scheduling modes for different transmission units, and therefore, the terminal performs transmission for the transmission unit based on the scheduling indication of the network device or performs transmission for the transmission unit based on the result of the LBT. To distinguish from the foregoing first scheduling mode and second scheduling mode, in the following descriptions, a mode in which the terminal performs transmission for the transmission unit based on the scheduling indication of the network device is referred to as a first transmission mode, and a mode in which the terminal performs transmission for the transmission unit based on the result of the LBT is referred to as a second transmission mode.

In some embodiments, the scheduling indication information is used to indicate a scheduling mode and a transmission mode, and the scheduling indication information may have the following several different implementations.

(1) The Scheduling Indication Information May be Carried in a Field in the DCI.

For example, the scheduling indication information may be carried in the foregoing first field. In this embodiment, the first field may occupy 2 bits, where a high-order bit in the first field is used to indicate the first scheduling mode or the second scheduling mode, and a low-order bit in the first field is used to indicate the first transmission mode or the second transmission mode. Alternatively, a low-order bit in the first field is used to indicate the first scheduling mode or the second scheduling mode, and a high-order bit in the first field is used to indicate the first transmission mode or the second transmission mode.

For example, when the value of the first field is “00”, the scheduling indication information indicates the first scheduling mode and the first transmission mode; when the value of the first field is “10”, the scheduling indication information indicates the second scheduling mode and the first transmission mode. In another embodiment, a high-order bit in the first field is used to indicate the first transmission mode or the second transmission mode, and a low-order bit in the first field is used to indicate the first scheduling mode or the second scheduling mode.

(2) The Scheduling Indication Information May be Carried in Multiple Fields in the DCI.

For example, the scheduling indication information may be carried in the foregoing first field and a second field. The second field may be a newly defined field in the DCI, and is used to indicate the first transmission mode or the second transmission mode. In this embodiment, the second field may be understood as a field indicating a transmission mode for a transmission unit. For example, when the network device schedules uplink transmission, the second field may be referred to as “Identifier for PUSCH mode”; when the network device schedules downlink transmission, the second field may be referred to as "Identifier for PDSCH mode".

For example, the first field and the second field each occupy 1 bit. When the value of the first field is "0", the scheduling indication information indicates the first scheduling mode; when the value of the first field is "1", the scheduling indication information indicates the second scheduling mode. When a value of the second field is "0", the scheduling indication information indicates the first transmission mode; when the value of the second field is "1", the scheduling indication information indicates the second transmission mode. Therefore, when a value of the first field and second field is "00", the scheduling indication information indicates the first scheduling mode and the first transmission mode, that is, indicates a mode in which the network device performs scheduling for one transmission unit, and the terminal performs transmission for the transmission unit based on the scheduling indication of the network device. Certainly, the first field and/or the second field may also reuse an existing field in the DCI. Similar to the second implementation in the foregoing descriptions, the scheduling indication information is carried in a field to indicate the first scheduling mode or the second scheduling mode.

(3) The Scheduling Indication Information May be Carried in the RRC Signaling.

In this embodiment of this application, multiple scheduling modes (modes) for a transmission unit may be predefined. For example, six modes are defined. The six modes are a mode 1, a mode 2, a mode 3, a mode 4, a mode 5, and a mode 6. The mode 1 indicates the foregoing first scheduling mode. The mode 2 indicates the foregoing second scheduling mode. The mode 3 indicates the foregoing first scheduling mode and first transmission mode. The mode 4 indicates the foregoing first scheduling mode and second transmission mode. The mode 5 indicates the foregoing second scheduling mode and first transmission mode. The mode 6 indicates the foregoing second scheduling mode and second transmission mode. The network device may send the RRC signaling to the terminal, to indicate a specific scheduling mode. It should be noted that a quantity and numbers of the foregoing modes are merely used as an example, and do not constitute a limitation.

(4) The Scheduling Indication Information is Carried in Both the DCI and the RRC Signaling.

In this embodiment of this application, the scheduling indication information may include two parts: a first part and a second part. The first part is used to indicate the first scheduling mode or the second scheduling mode, and the second part is used to indicate the first transmission mode or the second transmission mode. The first part may be carried in the DCI, and the second part may be carried in the RRC signaling. Alternatively, the first part is carried in the RRC signaling, and the second part is carried in the DCI. With reference to the foregoing descriptions, the first part (or the second part) may be carried in a newly defined field in the DCI, or may reuse an existing field in the DCI. The second part (or the first part) may be indicated by using a transmission mode predefined in the RRC signaling. In this implementation, the network device may send the DCI and the RRC signaling to the terminal, to send the scheduling indication information to the terminal.

(5) The Scheduling Indication Information is Indicated in a Newly Defined DCI Format.

The newly defined DCI format herein is a format different from the foregoing first DCI format and DCI format 0_0, DCI format 0_1, DCI format 1_0, and DCI format 1_1. For differentiation, in this embodiment of this application, the newly defined DCI format is referred to as a second DCI format. For example, the second DCI format is a newly defined DCI format A, used to indicate the first scheduling mode and the first transmission mode; the second DCI format is a newly defined DCI format B, used to indicate the first scheduling mode and the second transmission mode; the second DCI format is a newly defined DCI format C, used to indicate the second scheduling mode and the first transmission mode; or the second DCI format is a newly defined DCI format D, used to indicate the second scheduling mode and the second transmission mode.

When performing scheduling indication for scheduling for a transmission unit, the network device further indicates a scheduling parameter used by the terminal to perform transmission for the transmission unit. The scheduling parameter may be one or a combination of several of the following parameters: position of starting point (starting point), a terminal position (ending point), a partial transmission (partial slot) format, time domain resource allocation information, frequency domain resource allocation information, gap information, hybrid automatic repeat request (HARQ) process information, a quantity of scheduled transmission units, data new transmission indication information, modulation and coding scheme (MCS) indication information, redundancy version (RV) indication information, a carrier indicator, an uplink/supplementary uplink indicator (UL/SUL indicator), a bandwidth part indicator, a transmit power control command for scheduled PUSCH (TPC command for scheduled PUSCH), precoding information and number of layers, antenna ports, a phase tracking reference signal-demodulation reference signal association (PTRS-DMRS association) indication, a sounding reference signal resource indicator (SRS resource indicator, SRS request), a channel state information request (CSI request), code block group (CBG) indication information, a LBT type/channel access type, a channel access priority class indicator, and the like.

Specifically, in this embodiment of this application, the scheduling indication information may further include multiple scheduling parameters, and the multiple scheduling parameters may be the multiple scheduling parameters listed above. When the scheduling indication information is carried in the DCI, the multiple scheduling parameters may be respectively carried in different fields in the DCI. For example, the time domain resource allocation information may be carried in a "time domain resource allocation" field in the DCI.

For scheduling for multiple transmission units, in some embodiments, values of various scheduling parameters used in all the multiple transmission units may be the same, for example, positions of starting points and ending points of transmission for the transmission units and used MCSs are the same. In some other embodiments, a value of at least one scheduling parameter used in each of the multiple transmission units may be the same, but a value of another scheduling parameter in the transmission unit may be different. For example, MCSs used for all the transmission units are consistent, but time domain resource allocation positions or frequency domain resource positions corresponding to the transmission units are different.

A different value of a scheduling parameter used in each of the multiple transmission units indicates different content indicated by the scheduling indication information. This may include the following several cases.

In a first case, at least one scheduling parameter used in each of the multiple transmission units may have different values, and another scheduling parameter that is other than the at least one scheduling parameter and used in the multiple transmission units has a same value.

The scheduling indication information may be further used to indicate that at least one of multiple scheduling parameters has multiple values, and another scheduling parameter other than the at least one scheduling parameter has one value.

In a second case, a scheduling parameter used in each of the multiple transmission units may have a same value.

The scheduling indication information may be further used to indicate that each of the multiple scheduling parameters has one value. In this case, for each scheduling parameter, only one value needs to be set instead of setting multiple same values. Therefore, a quantity of bits occupied by the scheduling indication information indicating the values of the multiple scheduling parameters is reduced, thereby reducing signaling overheads.

In a third case, at least one scheduling parameter used in at least one of the multiple transmission units has a same value, but the at least one scheduling parameter used in at least one transmission unit has different values.

Figures 4, 5:
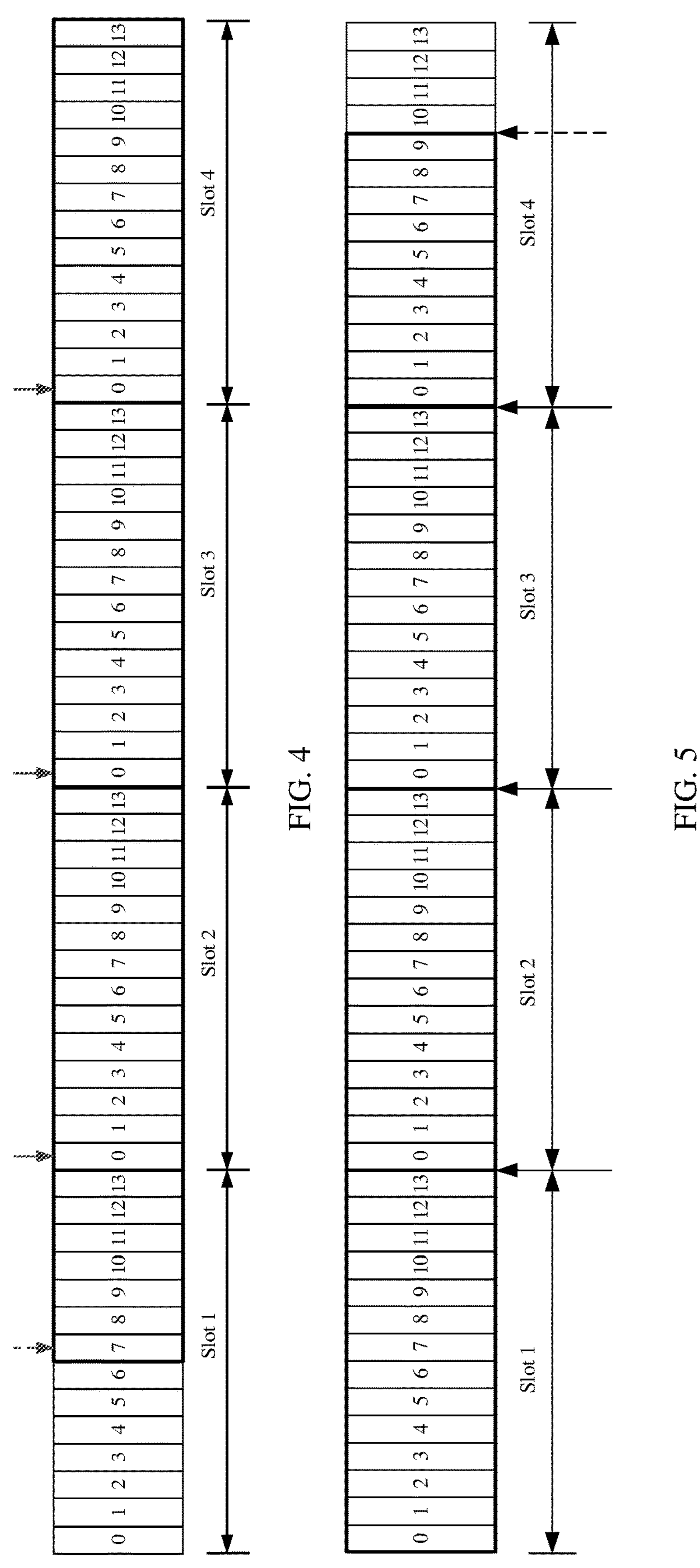
FIG. 4 is a schematic diagram of multiple consecutive transmission units according to an embodiment of this application.
FIG. 5 is a schematic diagram of multiple consecutive transmission units according to an embodiment of this application.

For example, FIG. 4 is a schematic diagram of multiple consecutive transmission units. For example, in FIG. 4, four consecutive transmission units are included, and one transmission unit is one slot. A transmission starting point (shown by a dotted arrow in FIG. 4) used for the $1^{st}$ transmission unit (slot 1) in the four transmission units is a symbol 7 in the slot 1. Transmission starting points (shown by solid arrows in FIG. 4) used for other transmission units (slot 2, slot 3, and slot 4) than the $1^{st}$ transmission unit are each a symbol 0 in each slot.

For another example, FIG. 5 is a schematic diagram of multiple consecutive transmission units. For example, in FIG. 5, four consecutive transmission units are included, and one transmission unit is one slot. A transmission ending point (shown by a dotted arrow in FIG. 5) used for the last transmission unit (slot 4) in the four transmission units is a symbol 9 in the slot 4. Transmission ending points (shown by solid arrows in FIG. 5) used for other transmission units (slot 1, slot 2, and slot 3) than the last transmission unit are each a symbol 13 in each slot.

For the third case, in this embodiment of this application, the scheduling indication information may indicate that at least one of the multiple included scheduling parameters has two values: a first value and a second value. The first value corresponds to the $1^{st}$ transmission unit in the multiple transmission units, and the second value corresponds to other transmission units than the $1^{st}$ transmission unit in the multiple transmission units; or the first value corresponds to the last transmission unit in the multiple transmission units, and the second value corresponds to other transmission units than the last transmission unit in the multiple transmission units. In this case, only one value needs to be indicated for the at least one scheduling parameter used in the other transmission units, and multiple same values do not need to be indicated separately, thereby reducing signaling overheads.

For the terminal, because the scheduling indication information indicates that at least one of the multiple included scheduling parameters has two values, for parsing the scheduling indication information, the terminal actually parses the at least one scheduling parameter used in two transmission units instead of parsing the at least one scheduling parameter used in all the transmission units, thereby reducing a burden on the terminal.

In some embodiments, scheduling performed by the network device by using at least one scheduling parameter that has a same value in other transmission units than the $1^{st}$ transmission unit and scheduling performed by the network device by using at least one scheduling parameter that has a same value in other transmission units than the last transmission unit may be considered as different scheduling modes. For example, in the third case, it may be understood that the scheduling performed by using at least one scheduling parameter that has a same value in other transmission units than the $1^{st}$ transmission unit is a third transmission mode, and the scheduling performed by using at least one scheduling parameter that has a same value in other transmission units than the last transmission unit is a fourth transmission mode.

The scheduling indication information is used to indicate an implementation of a scheduling mode (the first scheduling mode or the second scheduling mode) and a transmission mode (the third transmission mode or the fourth transmission mode). Refer to the foregoing scheduling indication information used to indicate a scheduling mode (the first scheduling mode or the second scheduling mode) and a transmission mode (the first transmission mode or the second transmission mode).

In some embodiments, the scheduling indication information is used to indicate a scheduling mode (the first scheduling mode or the second scheduling mode) and transmission modes (the first transmission mode or the second transmission mode, and the third transmission mode or the fourth transmission mode). Refer to the foregoing implementation of the scheduling indication information used to indicate a scheduling mode (the first scheduling mode or the second scheduling mode) and a transmission mode (the first transmission mode or the second transmission mode) for a possible implementation of the scheduling indication information. For example, the scheduling indication information is carried in the foregoing first field (the "indication of MODE" field or the "Identifier for multi-TTI scheduling" field) and the foregoing second field (for example, "Identifier for PUSCH mode"). In this embodiment, the first field may occupy 1 bit, and the second field may occupy 2 bits. A value of the first field is used to indicate the first scheduling mode or the second scheduling mode, a value of the $1^{st}$ bit in the 2 bits occupied by the second field is used to indicate the first transmission mode or the second transmission mode, and a value of the $2^{nd}$ bit in the 2 bits occupied by the second field is used to indicate the third transmission mode or the fourth transmission mode. In some embodiments, the value of the $2^{nd}$ bit in the 2 bits occupied by the second field is used to indicate the first transmission mode or the second transmission mode, and the value of the $1^{st}$ bit in the 2 bits occupied by the second field is used to indicate the third transmission mode or the fourth transmission mode. Only an example in which the scheduling indication information is carried in the first field and the second field is used above. In some embodiments, the scheduling indication information may be carried in the first field and a reused existing field in the DCI. A difference lies in that a quantity of bits occupied by the reused existing field in the DCI may increase.

In a fourth case, at least one scheduling parameter in some of the multiple transmission units has a same value, and the at least one scheduling parameter in remaining transmission units other than the some transmission units has a same value. In addition, the value of the at least one scheduling parameter in the some transmission units is different from the value of the at least one scheduling parameter in the remaining transmission units.

For example, there are four transmission units, a time domain resource allocation parameter in the $1^{st}$ transmission unit and the $3^{rd}$ transmission unit in the four transmission units has a same value, and the time domain resource allocation parameter in the $2^{nd}$ transmission unit and the $4^{th}$ transmission unit has a same value. That is, transmission modes in the some of the multiple transmission units are the same, and transmission modes in the remaining transmission units are the same.

In this case, the scheduling indication information is used to indicate that at least one of multiple included scheduling parameters has two values, one of the two values corresponds to the $1^{st}$ transmission unit and the $3^{rd}$ transmission unit, and the other value corresponds to the $2^{nd}$ transmission unit and the $4^{th}$ transmission unit. In this case, the scheduling indication information indicates that a quantity of the values of the at least one included scheduling parameter is less than a quantity of the multiple transmission units, so that signaling overheads are reduced.

For the terminal, if the scheduling indication information indicates two values, this may be the foregoing third case or the foregoing fourth case. For differentiation, in some embodiments, scheduling in the fourth case may be defined as a fifth transmission mode.

The scheduling indication information may be used to indicate the first scheduling mode or the second scheduling mode and a transmission mode (the third transmission mode, the fourth transmission mode, or the fifth transmission mode). Therefore, even if the scheduling indication information indicates that the at least one scheduling parameter has two values, whether the transmission mode is the third transmission mode, the fourth transmission mode, or the fifth transmission mode may be determined based on the scheduling indication information. Accordingly, a scheduling parameter in some of the multiple transmission units is parsed, but the scheduling parameter in all the transmission units does not need to be parsed, thereby reducing signaling overheads. In some embodiments, the scheduling indication information is carried in the foregoing first field (the "indication of MODE" field or the "Identifier for multi-TTI scheduling" field) and the foregoing second field (for example, "Identifier for PUSCH mode"). The first field may occupy 1 bit, the second field may occupy 2 bits, and the value of the second field is used to indicate the third transmission mode, the fourth transmission mode, or the fifth transmission mode.

In this embodiment of this application, the at least one scheduling parameter may be one or more of the parameters: the time domain resource allocation parameter, the frequency domain resource allocation parameter, the CBG indication information, and the start symbol parameter. The time domain resource allocation parameter may be carried in the "time domain resource allocation" field in the DCI, that is, the "time domain resource allocation" field includes the time domain resource allocation parameter. The frequency domain resource allocation parameter may be carried in the "frequency domain resource allocation" field in the DCI. Certainly, the foregoing descriptions are merely examples. Generally, if an ending symbol of a transmission unit and an allocated time domain resource are known, a start symbol is also known. Therefore, the at least one scheduling parameter may alternatively be an end symbol parameter.

In some embodiments, the scheduling indication information may further include gap indication information. The gap indication information is used to indicate a gap length, for example, 25 μs or 71 μs. For example, the gap indication information may be one of the at least one scheduling parameter.

Specifically, the gap indication information may be carried in a field in the DCI. For example, the field may be a "gap indication" field in the DCI. The "gap indication" field may occupy 2 bits. When a value of the "gap indication" field is "00", this corresponds to a first gap size; when the value of the "gap indication" field is "01", this corresponds to a second gap size. Examples are not provided one by one herein.

Multiple terminals can fairly compete for and use a time domain resource in an unlicensed frequency band. For example, there are three terminals, the three terminals are respectively a terminal 1, a terminal 2, and a terminal 3, and the terminal 1, the terminal 2, and the terminal 3 fairly compete for and use a preset time domain resource. If the terminal 1 always transmits data on the preset time domain resource, when performing LBT, the terminal 2 and the terminal 3 may determine that data is always being transmitted on the preset time domain resource, and the terminal 2 and the terminal 3 cannot transmit data. Consequently, service delays of the terminal 2 and the terminal 3 are long. Therefore, in this embodiment of this application, it may be understood that the scheduling indication information further includes the gap indication information, to reserve a resource for a terminal to perform LBT. The foregoing example is still used, that is, the gap indication information may indicate to reserve a gap on the preset time domain resource, so that the terminal 2 and the terminal 3 perform LBT in the reserved gap. If a result of the LBT performed by the terminal 2 or the terminal 3 within the gap is that no data is transmitted, the terminal 2 and the terminal 3 may transmit data without waiting for a long period of time.

In different embodiments, for one transmission unit, there may be one or more gaps. This may include the following several cases.

Case 1:

There is one gap, and the gap may be at any time domain position of the transmission unit, or may be before the transmission unit. When the gap is before the transmission unit, the terminal performs LBT before using the transmission unit. If determining that a channel is idle, data transmission may start at a start position of the transmission unit, to avoid a waste of resources. In this case, the scheduling indication information includes one piece of gap indication information.

Case 2:

There are multiple gaps, and the multiple gaps may be located in the transmission unit. In this case, the scheduling indication information may include multiple pieces of gap indication information.

In different embodiments, for multiple transmission units, there may also be one or more gaps. This may include the following several cases.

Case 1:

Gaps for the multiple transmission units are the same. In this case, the scheduling indication information may include one piece of gap indication information, but does not need to include multiple pieces of gap indication information, to reduce signaling overheads.

Case 2:

The network device sets a gap for each transmission unit, and the gap set for each transmission unit is different. In this case, the scheduling indication information includes multiple pieces of gap indication information, and the multiple pieces of gap indication information are in a one-to-one correspondence with the transmission units. In some embodiments, the gap set for each transmission unit may be located at any time domain position of the transmission unit. For example, the multiple transmission units may be multiple consecutive transmission units, and the gap of each transmission unit may be located in the transmission unit.

Alternatively, if two adjacent transmission units in the multiple transmission units are inconsecutive, the gap set for each transmission unit may be located in or before the transmission unit. When the gap set for each transmission unit is located before the transmission unit, the terminal may start data transmission at a start position of the transmission unit, to avoid a waste of resources.

Alternatively, if some of the multiple transmission units are consecutive, other transmission units than the some transmission units are inconsecutive. In this case, a gap set for each of the some transmission units may be located at any time domain position of the corresponding transmission unit. A gap set for each of the other transmission units may be located at any time domain position of the corresponding transmission unit or located before the corresponding transmission unit.

Case 3:

The network device sets a gap for at least one of the multiple transmission units, and does not set a gap set for another transmission unit other than the at least one transmission unit. In this case, a quantity of multiple pieces of gap indication information included in the scheduling indication information is less than a quantity of the multiple transmission units, to reduce signaling overheads as much as possible. Similar to Case 2, a gap set for each transmission unit may be located in or before the transmission unit. Details are not described herein again.

In some embodiments, the scheduling indication information may further include CBG indication information. The CBG indication information may be carried in a field in the DCI. For example, the field may be a "CBG transmission information" field in the DCI, and information included in "CBG transmission information" is a CBG-based bitmap. 1 bit in the bitmap corresponds to one CBG.

In this embodiment of this application, the scheduling indication information may include one piece of CBG indication information, or may include multiple pieces of CBG indication information. For one transmission unit, the scheduling indication information includes one piece of CBG indication information. For multiple transmission units, the scheduling indication information may include one or more pieces of CBG indication information. This may include the following several cases.

Case 1:

The CBG indication information for the multiple transmission units is the same. In this case, the scheduling indication information may include only one piece of CBG indication information, but does not need to include multiple pieces of CBG indication information, to reduce signaling overheads.

Case 2:

The network device sets a transmission mode of a CBG for each transmission unit, and the CBG set for each transmission unit is different. In this case, the scheduling indication information includes multiple pieces of CBG indication information, and the multiple pieces of CBG indication information are in a one-to-one correspondence with the transmission units.

Case 3:

The network device sets a transmission mode of a CBG for each transmission unit. CBGs set for remaining transmission units other than the 1$^{st}$ transmission unit in the multiple transmission units are the same, or CBGs set for the remaining transmission units other than the last transmission unit in the multiple transmission units are the same. In this case, the scheduling indication information includes two pieces of CBG indication information. One of the two pieces of CBG indication information corresponds to the 1$^{st}$ transmission unit or the last transmission unit, and the other piece of CBG indication information corresponds to the remaining transmission units. In this case, for the remaining transmission units, the network device needs to indicate only one piece of CBG indication information without needing to indicate multiple pieces of same CBG indication information separately, thereby reducing signaling overheads.

Case 4:

CBG indication information for some of the multiple transmission units is the same, and CBG indication information for remaining transmission units, namely, other transmission units other than the some transmission units, is the same. In addition, the CBG indication information for the some transmission units is different from the CBG indication information for the remaining transmission units.

For example, there are four transmission units. In the four transmission units, CBG indication information for the 1$^{st}$ transmission unit is the same as that for the 3$^{rd}$ transmission unit, and the CBG indication information for the 2$^{nd}$ transmission unit is the same as that for the 4$^{th}$ transmission unit. In this case, the scheduling indication information includes two pieces of CBG indication information, one of the two pieces of CBG indication information corresponds to the some transmission units, and the other piece of CBG indication information corresponds to the remaining transmission units. That is, a quantity of pieces of the CBG indication information included in the scheduling indication information is less than a quantity of the multiple transmission units, to reduce signaling overheads.

For the terminal, if the scheduling indication information includes two pieces of CBG indication information, this may be Case 3 or Case 4. Similarly, for differentiation, in some embodiments, scheduling in Case 2, scheduling in Case 3, and scheduling in Case 4 may be defined as different transmission modes. Details are not described herein again.

In S32, the network device sends the scheduling indication information to the terminal.

The network device determines the scheduling indication information, and may send the scheduling indication information to the terminal. For example, the network device sends a first message to the terminal, where the first message carries the scheduling indication information. The first message may also be understood as first signaling, and two concepts of "signaling" and "message" may be interchanged in the embodiments of this application. Details are not described in subsequent embodiments again. The first signaling is, for example, DCI and/or RRC signaling. This is not specifically limited, provided that the first signaling is used to indicate the scheduling indication information.

Specifically, refer to the descriptions in the foregoing embodiment. Based on different content indicated by the scheduling indication information, the scheduling indication information may be carried in a same field in the DCI, or may be carried in multiple fields in the DCI. Alternatively, the scheduling indication information may be carried in both the DCI and the RRC signaling. Alternatively, the scheduling indication information is indicated in a newly defined DCI format.

The foregoing describes content indicated by the scheduling indication information and how the network device indicates, by using the scheduling indication information, the terminal to perform scheduling for a transmission unit. The following describes a possible implementation of the scheduling indication information and how the terminal performs data transmission in the transmission unit based on received scheduling indication information, by using a specific example with reference to parsing of the scheduling indication information by the terminal. In the following descriptions, the at least one scheduling parameter in the foregoing descriptions is separately, for example, the time domain resource allocation parameter, the frequency domain resource allocation parameter, the gap indication information, and the CBG indication information.

In S33, the terminal receives the scheduling indication information from the network device, and performs data transmission in the transmission unit or the multiple transmission units based on the scheduling indication information.

Embodiment 1: For Example, the Scheduling Parameter is the Time Domain Resource Allocation Parameter In some embodiments, the scheduling indication information indicates that the network device performs scheduling for one transmission unit or multiple transmission units.

When the network device indicates the terminal to perform transmission for a transmission unit, the network device may send DCI carrying the scheduling indication information to the terminal. For example, the scheduling indication information may be carried in the foregoing first field. The first field may occupy 1 bit, used to carry the scheduling indication information. The terminal receives the DCI from the network device, and parses the first field in the DCI, to learn, based on a value of the first field, whether the network device performs scheduling for one transmission unit or multiple transmission units.

Scheduling performed by the network device for one transmission unit and scheduling performed by the network device for multiple transmission units may be considered as different scheduling modes. In some embodiments, the first field may be the foregoing “indication of MODE” field or “Identifier for multi-TTI scheduling”, and the first field occupies 1 bit, used to indicate a first scheduling mode or a second scheduling mode. The first scheduling mode corresponds to the scheduling performed by the network device for one transmission unit, and the second scheduling mode corresponds to the scheduling performed by the network device for multiple transmission units. For example, the first field is the foregoing “indication of MODE” field. When the terminal parses the scheduling indication information, if a value of the “indication of MODE” field is “0”, it may be considered that the first scheduling mode is used; if the value of the “indication of MODE” field is 1, it may be considered that the second scheduling mode is used. Alternatively, in some embodiments, if a value of the “indication of MODE” field is “0”, it may be considered that the second scheduling mode is used; if the value of the “indication of MODE” field is 1, it may be considered that the first scheduling mode is used.

The scheduling indication information may include the time domain resource allocation parameter, to indicate time domain resource information, so that the terminal performs data transmission in one or more transmission units based on the time domain resource information.

If the scheduling indication information indicates the first scheduling mode, that is, the network device performs scheduling for one transmission unit, the time domain resource allocation parameter included in the scheduling indication information may be one or a combination of several of the following information: an offset between a transmission unit that is for actual transmission and that is included in the field “time domain resource allocation” defined in DCI formats 0_0 and 0_1 in NR Rel-15 and a time unit in which the scheduling indication information is received, a start and length indicator value (SLIV), a start symbol index, a length (for example, a quantity of occupied symbols) occupied by the scheduling transmission unit, and a resource mapping mode. The resource mapping mode herein refers to, for example, a resource mapping type of a PUSCH.

The terminal may determine the time domain resource information based on values of the foregoing one or more time domain resource allocation parameters. For example, a correspondence between a value of the “time domain resource allocation” field and the time domain resource information is defined in TS 38.214, as shown in Table 1. If the terminal determines that a value of “time domain resource allocation” in the received DCI is m, the scheduling indication information corresponds to time domain resource information corresponding to “Row index=m+1”.

TABLE 1

Table 6.1.2.1.1-2: Default PUSCH time domain resource allocation A for normal CP

| Row index | PUSCH mapping type | $K_2$ | S | L |
|---|---|---|---|---|
| 1 | Type A | j | 0 | 14 |
| 2 | Type A | j | 0 | 12 |
| 3 | Type A | j | 0 | 10 |
| 4 | Type B | j | 2 | 10 |
| 5 | Type B | j | 4 | 10 |
| 6 | Type B | j | 4 | 8 |
| 7 | Type B | j | 4 | 6 |
| 8 | Type A | j + 1 | 0 | 14 |
| 9 | Type A | j + 1 | 0 | 12 |
| 10 | Type A | j + 1 | 0 | 10 |
| 11 | Type A | j + 2 | 0 | 14 |
| 12 | Type A | j + 2 | 0 | 12 |
| 13 | Type A | j + 2 | 0 | 10 |
| 14 | Type B | j | 8 | 6 |
| 15 | Type A | j + 3 | 0 | 14 |
| 16 | Type A | j + 3 | 0 | 10 |

Time domain resource allocation parameters shown in Table 1 include the resource mapping mode (PUSCH mapping type), $K_2$, S, and L, where $K_2$ is the offset of the time unit, S indicates the start symbol index, and L indicates a quantity of symbols occupied by a PUSCH. A value of j is related to a subcarrier spacing. For example, a correspondence between the value of j and the subcarrier spacing is shown in Table 2. When the subcarrier spacing is $\mu_{PUSCH}=0$, namely, 15 kHz, j=1.

TABLE 2

TABLE 6.1.2.1.1-4: Definition of value j

| $\mu_{PUSCH}$ | j |
|---|---|
| 0 | 1 |
| 1 | 1 |

TABLE 2-continued

TABLE 6.1.2.1.1-4: Definition of value j

| $\mu_{PUSCH}$ | j |
| --- | --- |
| 2 | 2 |
| 3 | 3 |

In this embodiment of this application, if the scheduling indication information indicates the second scheduling mode, that is, the network device performs scheduling for multiple transmission units, the time domain resource allocation parameter included in the scheduling indication information may still use the foregoing implementation in which the network device performs scheduling for a single transmission unit, and is also indicated based on "time domain resource allocation". This is more compatible with a conventional technology.

Different from the scheduling indication information indicating the first scheduling mode, "time domain resource allocation" needs to include one or a combination of several of an offset ($K_2$) corresponding to multiple transmission units for actual transmission, an SLIV for the multiple transmission units, a start symbol index (or an end symbol index) for the multiple transmission units, a length (L) occupied by the multiple transmission units, a resource mapping mode, and the like. The $K_2$, the SLIV, the start symbol index, or the resource mapping mode may each have one value or multiple values.

Specifically, content included in "time domain resource allocation" may be indicated in a manner predefined in a protocol and/or indicated in RRC signaling. For example, a configuration parameter list of the foregoing time domain resource information may be predefined. In the RRC signaling, PUSCH-allocationlist may be defined for an uplink to indicate the configuration parameter list, and PDSCH-allocationlist may be defined for a downlink to indicate the configuration parameter list.

Alternatively, content carried in the foregoing "time domain resource allocation" may be predefined in a protocol. For example, a correspondence between a value of "time domain resource allocation" and the time domain resource information, for example, Table 3, may be in the protocol. It should be noted that values of $K_2$, S, and L in Table 3 are all used as examples for description, and constitute no limitation on the embodiments of this application.

TABLE 3

TABLE B. Default multi-TTI PUSCH time domain resource allocation A for normal CP

| Row index | PUSCH mapping type | $K_2$ | S | L |
| --- | --- | --- | --- | --- |
| 1 | Type B | j | 0 | 14 |
| 2 | Type B | j | 0 | 12 |
| 3 | Type B | j | 0 | 10 |
| 4 | Type B | j | 2 | 10 |
| 5 | Type B | j | 2 | 10 |
| 6 | Type B | j | 4 | 8 |
| 7 | Type B | j | 4 | 6 |
| 8 | Type B | j | 7 | 14 |
| 9 | Type B | {j1, j2} | 0 | 12 |
| 10 | Type B | {j1, j2} | 0 | 10 |
| 11 | Type B | {j1, j2} | 0 | 14 |
| 12 | Type B | {j1, j2} | 0 | 12 |
| 13 | Type B | {j1, j2, j3, j4} | {S1, S2, S3, S4} | {L1, L2, L3, L4} |
| 14 | Type B | {j1, j2, j3, j4} | {S1, S2, S3, S4} | {L1, L2, L3, L4} |
| 15 | Type B | {j1, j2, j3, j4} | {S1, S2, S3, S4} | {L1, L2, L3, L4} |
| 16 | Type B | {j1, j2, j3, j4} | {S1, S2, S3, S4} | {L1, L2, L3, L4} |

As shown in Table 3, $K_2$, S, and L may each have one or more values. For example, each value of $K_2$ has the correspondence shown in Table 2 with the subcarrier spacing. Optionally, the value of $K_2$ may alternatively be any other value defined in a standard. For example, j1=1, j2=3, j3=5, and j4=8.

Figure 6:
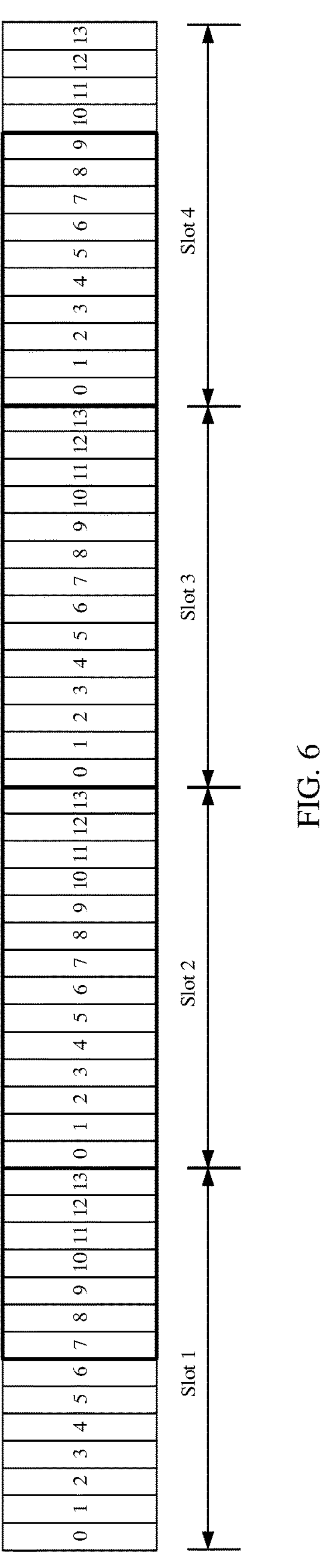
FIG. 6 is a schematic diagram of multiple consecutive transmission units according to an embodiment of this application.

For example, refer to FIG. 6. In FIG. 6, for example, four consecutive slots are included. When $K_2$ has one value, this corresponds to a time offset between the $1^{st}$ slot in the four slots and a time unit in which current indication information is located. For example, if the scheduling indication information is received in a slot n, it indicates that the $1^{st}$ slot in the four slots used for uplink transmission is located in a slot $n+K_2$, where n is a slot number. When the multiple transmission units are multiple inconsecutive transmission units, $K_2$ may have multiple values, which respectively correspond to offsets of the transmission units.

S has one value: If the multiple transmission units are multiple consecutive transmission units, the value of S may correspond to a start symbol of the $1^{st}$ transmission unit in the multiple transmission units; or the value of S may correspond to the multiple transmission units. In this case, it may be considered that start symbols of all the multiple transmission units are the same.

S has multiple values: A quantity of the values of S may be less than or equal to a quantity of the multiple transmission units. If the quantity of the values of S is equal to the quantity of the multiple transmission units, and one value of S corresponds to one transmission unit, it may be considered that a start symbol of each transmission unit is different. For example, when the multiple transmission units are multiple inconsecutive transmission units, the start symbol of each transmission unit is different.

If the quantity of the values of S is less than the quantity of the multiple transmission units, it may be considered that start symbols of some of the multiple transmission units are the same, and one value of S corresponds to start symbols of the some transmission units. For example, S has two values. For the multiple transmission units that are multiple inconsecutive transmission units, it may be considered that start symbols of some of the multiple transmission units are the same, and start symbols of remaining transmission units other than the some transmission units are the same. For the multiple transmission units that are multiple consecutive transmission units, it may be considered that start symbols of other transmission units than the $1^{st}$ transmission unit in the multiple transmission units are the same.

Similar to S, L may also have one or more values. For details, refer to the implementations of S.

In another possible implementation, if the network device sends the RRC signaling and the DCI to the terminal to indicate the scheduling indication information, in this embodiment of this application, a table of the time domain resource information may be defined in, for example, the foregoing PUSCH-allocationlist. In this way, the table defined in PUSCH-allocationlist may be searched for time domain resource information corresponding to a value indicated by "time domain resource allocation" in the DCI. For example, the table of the time domain resource information may be defined in PUSCH-allocationlist, and one index in the defined table corresponds to one or more SLIVs. An index corresponding to a value carried in "time domain resource allocation" is obtained from the defined table of the time domain resource information, and then one or more corresponding SLIVs are searched for based on the obtained index.

In still another possible implementation, if the network device notifies the terminal of a newly defined DCI format, used to indicate the first scheduling mode or the second scheduling mode. For example, newly defined DCI format 0_0A is used to indicate the first scheduling mode, and newly defined DCI format 0_1A is used to indicate the second scheduling mode. The time domain resource allocation parameter included in the scheduling indication information may be carried in "time domain resource allocation" in the DCI. This is similar to the implementation described in the embodiment in Table 3. Different from Table 3, the time domain resource allocation parameter may include $K_2$, S, and an end symbol index (E), but does not include a transmission unit length L. For example, Table 4 may be defined in a protocol. For example, each value of $K_2$ has the correspondence shown in Table 2 with the subcarrier spacing. Optionally, a value of $K_2$ may alternatively be any other value defined in a standard. For example, j1=1, j2=3, 5 j3=5, and j4=8.

TABLE 4

TABLE C Default multi-TTI PUSCH time domain resource allocation A for normal CP

| Row index | PUSCH mapping type | $K_2$ | S | E |
|---|---|---|---|---|
| 1 | Type B | j | 0 | 13 |
| 2 | Type B | j | 0 | 12 |
| 3 | Type B | j | 0 | 10 |
| 4 | Type B | j | 2 | 10 |
| 5 | Type B | j | 2 | 10 |
| 6 | Type B | j | 4 | 8 |
| 7 | Type B | j | 4 | 6 |
| 8 | Type B | j | 7 | 13 |
| 9 | Type B | {j1, j2} | 0 | 12 |
| 10 | Type B | {j1, j2} | 0 | 10 |
| 11 | Type B | {j1, j2} | 0 | 13 |
| 12 | Type B | {j1, j2} | 0 | 12 |
| 13 | Type B | {j1, j2, j3, j4} | {S1, S2, S3, S4} | {E1, E2, E3, E4} |
| 14 | Type B | {j1, j2, j3, j4} | {S1, S2, S3, S4} | {E1, E2, E3, E4} |
| 15 | Type B | {j1, j2, j3, j4} | {S1, S2, S3, S4} | {E1, E2, E3, E4} |
| 16 | Type B | {j1, j2, j3, j4} | {S1, S2, S3, S4} | {E1, E2, E3, E4} |

In Table 4, E may also have one or more values. For example, if E has one value, it may be considered that end symbols of the multiple transmission unit are the same. E may have multiple values. For example, E has two values. For multiple consecutive transmission units, it may be considered that end symbols of other transmission units than the last transmission unit in the multiple transmission units are the same; or it may be considered that end symbols of some of the multiple transmission units are the same, and end symbols of other transmission units than the some transmission units are the same. It should be noted that values of $K_2$, S, and E in Table 4 are all used as examples for description.

Similarly, if the network device sends the RRC signaling and the DCI to the terminal, used to indicate the scheduling indication information. An indication of the time domain resource allocation parameter included in the scheduling indication information may be implemented with reference to the foregoing manner of defining the table of the time domain resource information in the foregoing PUSCH-allocationlist.

If the network device notifies the terminal of the newly defined DCI format, used to indicate the first scheduling mode or the second scheduling mode, an indication of the time domain resource allocation parameter included in the scheduling indication information may be implemented with reference to the foregoing embodiment in Table 2.

It may be considered that different quantities of values of the time domain resource allocation parameter included in the scheduling indication information correspond to different scheduling modes. For example, the values of S include a first value and a second value. For example, the first field in the foregoing embodiment may be the foregoing "indication of MODE", used to indicate the first scheduling mode or the second scheduling mode and a transmission mode (the third transmission mode, the fourth transmission mode, or the fifth transmission mode). Therefore, the terminal may determine, based on a value of "indication of MODE", a transmission mode in which transmission is performed for multiple scheduling units, and further determine a transmission unit or transmission units corresponding to the two values of S.

Embodiment 2: For Example, the Scheduling Parameter is the Frequency Domain Resource Allocation Parameter Same as Embodiment 1, the scheduling indication information may carry the foregoing "indication of MODE" field or "Identifier for multi-TTI scheduling" field, used to indicate the first scheduling mode or the second scheduling mode. Different from Embodiment 1, the frequency domain resource allocation parameter included in the scheduling indication information is a frequency domain resource allocation type and frequency domain resource information of the corresponding type that are included in the field "frequency domain resource allocation" defined in DCI formats 0_0 and 0_1 in NR Rel-15. For example, the frequency domain resource information includes a combination of one or more of resource index information, resource quantity information, and the like.

For example, 2 bits in multiple bits occupied by "frequency domain resource allocation" may be used to indicate the resource allocation type. For example, if a value of the 2 bits is 00, it indicates that the resource allocation type is a type 0; if the value of the 2 bits is "01", it indicates that the resource allocation type is a type 1; if the value of the 2 bits is "10", it indicates that the resource allocation type is a type X. The type 0 is a bitmap manner based on a resource block group (RBG), and the type 1 is a resource allocation manner based on consecutive resource blocks. Currently, the type 0 and the type 1 are already supported in NR Rel-15. The type X is a new resource allocation type introduced in this embodiment of this application, and the type X may be understood as an interlace-based resource allocation manner. The interlace may be understood as a resource set including a cluster of resources distributed in a subband, a bandwidth part (BWP), or a carrier at equal intervals. For example, the interlace may be an RB, a subcarrier, or a subcarrier set.

In some embodiments, information that is included in the scheduling indication information and used to indicate the resource allocation type may alternatively be carried in a newly defined field in the DCI, for example, "frequency domain resource allocation type indication". For example, if the scheduling indication information indicates that the resource allocation type is the type 0, namely, the bitmap manner based on a resource block group, "frequency domain resource allocation type indication" should further include one piece of information about a bitmap. 1 bit in the bitmap corresponds to one resource block or resource block group. For example, if a value of a corresponding bit is "1", it may indicate that a resource block or resource block group corresponding to the bit is already allocated; if the value of the corresponding bit is "0", it may indicate that the resource block or resource block group corresponding to the bit is not allocated. If the scheduling indication information indicates that the resource allocation type is the type 1, namely, the resource allocation manner based on consecutive resource blocks, "frequency domain resource allocation type indication" should include one piece of resource indication value (RIV) information. An index $RB_{start}$ of a start resource block in allocated consecutive resource blocks and a quantity $L_{RBs}$ of the allocated consecutive resource blocks may be determined based on the RIV information.

Specifically, a correspondence among the RIV, $RB_{start}$, and $L_{RBs}$ is as follows:

When $$(L_{RBs}-1) \leq \lfloor N_{BWP}^{size}/2 \rfloor,$$

the RIV is determined according to formula (1); otherwise, the RIV is determined according to formula (2):

$$RIV = N_{BWP}^{size}(L_{RBs}-1) + RB_{start}; \text{ and} \tag{1}$$

$$RIV = N_{BWP}^{size}(N_{BWP}^{size} - L_{Rbs} + 1) + (N_{BWP}^{size} - 1 - RB_{start}). \tag{2}$$

$$N_{BWP}^{size}$$

in the formula (2) is a quantity of available PRBs in a corresponding BWP.

If the resource allocation type included in the scheduling indication information is the type X, in some embodiments, "frequency domain resource allocation type indication" should carry one piece of interlace-based RIV information, and one piece of RIV information corresponds to one or more interlace resources. Resources indicated by one or more interlaces are shown in formula (3):

$$RB_{START}+l+i \times N \tag{3}$$

In formula (3), N is a quantity of interlaces; $i \in [0, M]$, where M is a quantity of resources included in an interlace (where different interlaces may include different quantities of resources); and $l \in [0, L]$, where L is a quantity of allocated interlaces, and $RB_{START}$ is an index of a start resource in the allocated resources.

Specifically, a correspondence among the RIV, $RB_{START}$, N, and L is as follows:

When $(L-1) \leq \lfloor N/2 \rfloor$, the RIV is determined according to formula (1); otherwise, the RIV is determined according to formula (2):

$$RIV = N(L-1) + RB_{START} \tag{1; and}$$

$$RIV = N(N-L+1) + (N-1-RB_{START}) \tag{2}$$

In some other embodiments, "frequency domain resource allocation type indication" should include one piece of interlace-based bitmap information, and 1 bit in the bitmap corresponds to one interlace. For example, if a value of a corresponding bit is "1", it may indicate that an interlace corresponding to the bit is already allocated; if the value of the corresponding bit is "0", it may indicate that the interlace corresponding to the bit is not allocated.

Different from one transmission unit, for scheduling for multiple transmission units, the frequency domain resource allocation parameter included in the scheduling indication information may have one or more values. For example, the scheduling indication information may include one or more pieces of indication information used to indicate one or more resource allocation types. When the scheduling indication information includes one piece of indication information used to indicate a resource allocation type, the terminal may consider that resource allocation types for the multiple transmission units are the same. When the scheduling indication information includes multiple pieces of indication information used to indicate resource allocation types, the terminal may consider that resource allocation types for the multiple transmission units are different.

The frequency domain resource allocation parameter included in the scheduling indication information may be carried in one field in the DCI, or may be carried in multiple fields in the DCI, for example, carried in two fields. The two fields may be "frequency domain resource allocation1" and "frequency domain resource allocation2".

If the resource allocation type included in the scheduling indication information is the type 0, the scheduling indication information may include one or more pieces of bitmap information carried in the field "frequency domain resource allocation". If the resource allocation type included in the scheduling indication information is the type 1, the scheduling indication information may include one or more pieces of RIV information carried in "frequency domain resource allocation". Alternatively, if the resource allocation type included in the scheduling indication information is the type X, the scheduling indication information may include one or more pieces of interlace-based RIV information carried in "frequency domain resource allocation". One piece of RIV information corresponds to one or more interlace resources. Alternatively, if the resource allocation type included in the scheduling indication information is the type X, the scheduling indication information may include one or more pieces of interlace-based bitmap information carried in "frequency domain resource allocation".

If the foregoing "frequency domain resource allocation" includes one piece of bitmap information, RIV information, or interlace-based RIV information, it may be considered that frequency domain resource information for the multiple transmission units is the same. If "frequency domain resource allocation" includes multiple pieces of bitmap information, RIV information, or interlace-based RIV information, it may be considered that frequency domain resource information for the multiple transmission units is different.

In an example implementation, if frequency domain resource allocations for the multiple transmission units are consistent, the frequency domain resource allocation parameter included in the scheduling indication information has one value. For example, the frequency domain resource allocation parameter included in the scheduling indication information may include one or a combination of several of one piece of bitmap information, one piece of RIV information, one piece of interlace-based RIV information, and one piece of interlace-based bitmap information. If frequency domain resource allocations for the multiple transmission units are inconsistent, the frequency domain resource allocation parameter included in the scheduling indication information has multiple values. For example, the frequency domain resource allocation parameter included in the scheduling indication information may include one or a combination of several of multiple pieces of bitmap information, multiple pieces of RIV information, multiple pieces of interlace-based RIV information, and multiple pieces of interlace-based bitmap information.

In some embodiments, the frequency domain resource parameter included in the scheduling indication information may be further used to indicate bandwidth indication information. The bandwidth indication information may be used to indicate one or a combination of several of a BWP index, a subband index, a carrier index, and the like. The scheduling indication information may include one or more pieces of bandwidth indication information. If the bandwidth information for the multiple transmission units is consistent, the scheduling indication information includes one piece of bandwidth indication information. If the frequency domain resource allocations for the multiple transmission units are inconsistent, the scheduling indication information includes multiple pieces of bandwidth indication information.

Same as Embodiment 1, the scheduling indication information may indicate the frequency domain resource information by using RRC signaling. Specifically, refer to the foregoing implementation of indicating the time domain resource information by using RRC signaling.

Same as the time domain resource allocation parameter included in the scheduling indication information, when the frequency domain resource allocation parameter included in the scheduling indication information has different values, it may be considered that different scheduling modes are used. For how the terminal determines a correspondence between a value of the frequency domain resource allocation parameter and a transmission unit, refer to the descriptions in Embodiment 1.

Embodiment 3: For Example, the Scheduling Parameter is the Gap Indication Information Different from Embodiment 1, the scheduling indication information may further include one piece of gap indication information or multiple pieces of gap indication information. Each piece of gap indication information may indicate gaps of one or more sizes.

For example, for one transmission unit, the scheduling indication information may include one piece of gap indication information or multiple pieces of gap information, to reserve one or more gaps for the terminal to perform LBT. For multiple transmission units, when gap information for the multiple transmission units is consistent, the scheduling indication information includes one piece of gap indication information, to reduce signaling overheads. When a gap exists in only the 1st transmission units in the multiple transmission units, the scheduling indication information includes one piece of gap indication information. When the gap information for the multiple transmission units is inconsistent, the scheduling indication information includes multiple pieces of gap indication information, which respectively indicate gap information for the multiple transmission units.

For the terminal, if determining that the scheduling indication information includes one piece of gap indication information, the terminal may determine, based on the first scheduling mode or the second scheduling mode indicated by the scheduling indication information, that the gap indication information is applicable to one transmission unit or multiple transmission units. Further, if determining that the second scheduling mode is used, the terminal may further determine that the gap indication information is applicable to the 1st transmission unit or multiple transmission units. For example, the scheduling indication information includes only one piece of gap indication information, a transmission mode in which a gap is set for all transmission units or a transmission mode in which a gap is set for some of multiple transmission units is used in a system by default for the multiple transmission units. The terminal may resolve the set transmission mode, for example, the transmission mode in which a gap is set for all transmission units, and determine that the gap indication information is applicable to the multiple transmission units.

Same as the time domain resource allocation parameter included in the scheduling indication information, when the scheduling indication information includes different quantities of pieces of gap indication information, it may be considered that different scheduling modes are used. For how the terminal determines a correspondence between the gap indication information included in the scheduling indication information and a transmission unit, refer to the descriptions in Embodiment 1.

Embodiment 4: For Example, the Scheduling Parameter is the CBG Indication Information Different from Embodiment 1, the scheduling indication information may further include one piece of CBG indication information or multiple pieces of CBG indication information.

For example, for one transmission unit, the scheduling indication information may include one piece of CBG indication information or multiple pieces of CBG indication information. For multiple transmission units, when CBG information for the multiple transmission units is consistent, the scheduling indication information may include only one piece of CBG indication information, to reduce signaling overheads. When the CBG information for the multiple transmission units is inconsistent, the scheduling indication information includes multiple pieces of CBG indication information, which respectively indicate CBG information for the multiple transmission units.

For the terminal, if determining that the scheduling indication information includes only one piece of CBG indication information, the terminal may determine, based on the first scheduling mode or the second scheduling mode indicated by the scheduling indication information, that the CBG indication information is applicable to one transmission unit or multiple transmission units. Further, if determining that the second scheduling mode is used, the terminal may further determine that the CBG indication information is applicable to the 1st transmission unit or multiple transmission units. For example, the scheduling indication information includes only one piece of CBG indication information, a transmission mode in which a CBG is set for all transmission units or a transmission mode in which a CBG is set for some of multiple transmission units is used in a system by default for the multiple transmission units. The terminal may parse the transmission mode indicated by the scheduling indication information, for example, the transmission mode in which a CBG is set for all transmission units, and determine that the CBG indication information corresponds to the multiple transmission units. If the scheduling indication information indicates a transmission mode in which a CBG is set for the $1^{st}$ transmission unit, the terminal determines that the CBG indication information corresponds to the $1^{st}$ transmission unit.

In this embodiment of this application, the scheduling indication information may be used to indicate the first scheduling mode or the second scheduling mode; the scheduling indication information may be used to indicate the first scheduling mode or the second scheduling mode, and a transmission mode (the first transmission mode or the second transmission mode); or the scheduling indication information may be used to indicate the first scheduling mode or the second scheduling mode, and transmission modes (the first transmission mode or the second transmission mode, and the third transmission mode, the fourth transmission mode, or the fifth transmission mode). An implementation of the scheduling indication information varies based on different content indicated by the scheduling indication information. For example, if the scheduling indication information is carried in the DCI, the scheduling indication information may be carried in a newly defined field in the DCI, or may be carried in the newly defined field in the DCI and a reused existing field in the DCI. Alternatively, the scheduling indication information may be indicated in a newly defined DCI format. Therefore, new DCI is designed in this embodiment of this application. For ease of understanding, specific DCI is used for description below.

In some embodiments, DCI may be shown in Table 5.

TABLE 5

Enhanced DCI format for multi-TTI scheduling on top of DCI format 0_0

| Fields | Description |
|---|---|
| Identifier for DCI format | Indicating an uplink DCI format |
| Identifier for multi-TTI scheduling | Indicating multi-TTI scheduling (indicating multi-TTI |
| Identifier for PUSCH mode | Indicating transmission mode for PUSCH |
| Quantity of scheduled TTIs | Indicating the quantity N of scheduled TTIs (indicating the Numbe of scheduled TTIs, N) |
| Frequency domain resource assignment | Provide same or different time domain resource allocation (interlace based) across multiple TTIs |
| Time domain resource assignment | Provide one or more SLIVs (start symbol and length) for the time domain resource allocation |
| LBT gap indication/starting position | Indicating whether a LBT gap (e.g. 25 μs) should be left before the transmission (indicating whether a LBT gap (e.g. 25 μs) should be left before the transmission) |
| Modulation and coding scheme | Same as R15 |
| New data indicator | 1 bit * N, where N represents the number of scheduled TTIs |
| Redundancy version | 2 bits * N, where N represents the number of scheduled TTIs |
| HARQ process number | Like 4 bits in R15, the 4 bits applies to the $1^{st}$ scheduled TTI, and the HARQ process numbers for other scheduled 4 4 bits as R15, the 4-bit applies to the first scheduled TTI, and the HARQ process numbers for other scheduled TTIs are determined by mod (HARQ_ID + i, N_HARQ _process) and i = 1, . . . , N-1, where N_HARQ _process is the quantity of configured HARQ processes (4 bits as R15, the 4-bit applies to the first scheduled TTI, and the HARQ process numbers for other scheduled TTIs are determined by mod(HARQ_ID + i, N_HARQ _process), i = 1, . . . , N − 1, where N_HARQ _process is the number of configured HARQ process) |
| TPC command for scheduled PUSCH | Same as R15 |
| Padding bits | Same as R15 |
| UL/SUL indicator | Same as R15 |
| Channel access type indication | Cat 1 or Cat 2 or Cat 4 |
| Channel access priority | Indicating the channel access priority for Cat 4 LBT procedure |

In some embodiments, DCI may be shown in Table 6.

TABLE 6

Enhanced DCI format for multi-TTI scheduling on top of DCI format 0_0

| Fields | Description |
|---|---|
| Identifier for DCI format | Indicating an uplink DCI format |
| Carrier indicator | Same as R15 |
| Bandwidth part indicator | Same as R15 |
| Identifier for PUSCH mode | Indicating transmission mode for PUSCH |
| Identifier for multi-TTI scheduling | Indicating multi-TTI scheduling |
| Quantity of scheduled TTIs (number of scheduled TTIs) | Indicating the quantity N of scheduled TTIs (indicating the Number of scheduled TTIs, N) |
| Frequency domain resource assignment | Provide same or different time domain resource allocation (interlace based) across multiple TTIs |

TABLE 6-continued

Enhanced DCI format for multi-TTI scheduling on top of DCI format 0_0

| Fields | Description |
|---|---|
| Time domain resource assignment | Provide one or more SLIVs (start symbol and length) for the time domain resource allocation |
| LBT gap indication/starting position | Indicating whether a LBT gap (e.g. 25 μs) should be left before the transmission (indicating whether a LBT gap (e.g. 25 μs) should be left before the transmission) |
| Modulation and coding scheme | Same as R15 |
| New data indicator | Same as R15 |
| Redundancy version | 2 bits * N, where N represents the number of scheduled TTIs |
| HARQ process number | Like 4 bits in R15, the 4 bits applies to the $1^{st}$ scheduled TTI, and the HARQ process numbers for other scheduled TTIs are determined by mod(HARQ_ID + i, N_HARQ _process) and i = 1, . . . , N-1, where N_HARQ _process is the quantity of configured HARQ processes (4 bits as R15, the 4-bit applies to the first scheduled TTI, and the HARQ process numbers for other scheduled TTIs are determined by mod(HARQ_ID + i, N_HARQ _process), i = 1, . . . , N − 1) |
| TPC command for scheduled PUSCH | Same as R15 |
| Padding bits | Same as R15 |
| UL/SUL indicator | Same as R15 |
| SRS resource indicator | Same as R15 or enhancement to support interlace-based SRS |
| Precoding information and quantity of layers (precoding information and number of layers) | Same as R15 |
| Antenna ports | Same as R15 |
| SRS request | Same as R15 |
| CSI request | Same as R15 |
| CBG transmission information (CBGTI) | One or more sub-fields to indicate the CBG transmission for multi-TTI scheduling |
| PTRS-DMRS association (PTRS-DMRS association) | Same as R15 |
| beta_offset indicator | Same as R15 |
| DMRS sequence initialization | Same as R15 |
| Channel access type indication | Cat 1 or Cat 2 or Cat 4 |
| Channel access priority | Indicating the channel access priority for Cat 4 LBT procedure |

In some embodiments, the DCI may be shown in Table 5 or Table 6.

According to the foregoing solutions of this application, the scheduling indication information may indicate that a scheduled transmission unit is one transmission unit or multiple transmission units, to explicitly a manner in which the terminal performs transmission for the multiple transmission units when there are the multiple transmission units. This helps reduce overheads of performing LBT by the terminal for the multiple transmission units.

In the embodiments provided in this application, the method provided in the embodiments of this application is described from perspectives of the network device, the terminal, and interaction between the network device and the terminal. To implement functions in the foregoing method provided in the embodiments of this application, the network device and the terminal device may include a hardware structure and/or a software module, and implement the foregoing functions in a form of the hardware structure, the software module, or a combination of the hardware structure and the software module. Whether a function in the foregoing functions is performed by using the hardware structure, the software module, or the combination of the hardware structure and the software module depends on a specific application and a design constraint of the technical solutions.

The following describes, with reference to the accompanying drawings, communication apparatuses configured to implement the foregoing method in the embodiments of this application. Therefore, all the foregoing content may be used in the following embodiments, and repeated content is not described again.

Figure 7:
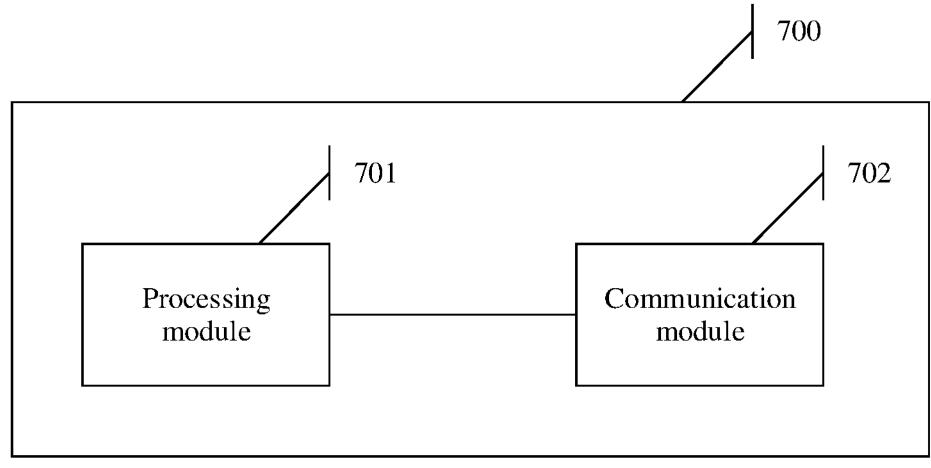
FIG. 7 is a schematic diagram of a structure of a communication apparatus according to an embodiment of this application.

FIG. 7 is a schematic diagram of a structure of a communication apparatus 700. The communication apparatus 700 may be a network device, and can implement a function of the network device in the method provided in the embodiments of this application. The communication apparatus 700 may alternatively be an apparatus that can support the network device in implementing a function of the network device in the method provided in the embodiments of this application. The communication apparatus 700 may be a hardware structure, a software module, or a combination of the hardware structure and the software module. The communication apparatus 700 may be implemented by a chip system. In this embodiment of this application, the chip system may include a chip, or may include the chip and another discrete component.

The communication apparatus 700 may include a processing module 701 and a communication module 702.

The processing module 701 may be configured to perform step S31 in the embodiment shown in FIG. 3, and/or configured to support another process of the technology described in this specification.

The communication module 702 is configured for communication between the communication apparatus 700 and another module. The communication module 702 may be a circuit, a component, an interface, a bus, a software module, a transceiver, or any other apparatus that can implement communication.

The communication module 702 may be configured to perform step S32 in the embodiment shown in FIG. 3, and/or configured to support another process of the technology described in this specification.

All related content of the steps in the foregoing method embodiments may be cited in function descriptions of a corresponding function module.

Figure 8:
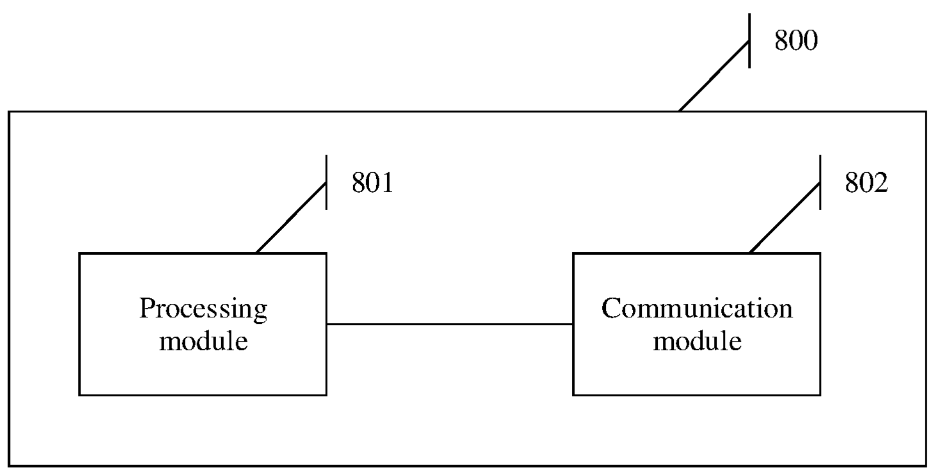
FIG. 8 is a schematic diagram of a structure of another communication apparatus according to an embodiment of this application.

FIG. 8 is a schematic diagram of a structure of a communication apparatus 800. The communication apparatus 800 may be a terminal, and can implement a function of the terminal in the method provided in the embodiments of this application. The communication apparatus 800 may alternatively be an apparatus that can support a terminal in implementing a function of the terminal in the method provided in the embodiments of this application. The communication apparatus 800 may be a hardware structure, a software module, or a combination of the hardware structure and the software module. The communication apparatus 800 may be implemented by a chip system. In this embodiment of this application, the chip system may include a chip, or may include the chip and another discrete component.

The communication apparatus 800 may include a processing module 801 and a communication module 802.

The processing module 801 may be configured to perform step S33 in the embodiment shown in FIG. 3, and/or configured to support another process of the technology described in this specification.

The communication module 802 may be configured to perform step S32 in the embodiment shown in FIG. 3, and/or configured to support another process of the technology described in this specification. The communication module 802 is configured for communication between the communication apparatus 800 and another module. The communication module 802 may be a circuit, a component, an interface, a bus, a software module, a transceiver, or any other apparatus that can implement communication.

All related content of the steps in the foregoing method embodiments may be cited in function descriptions of a corresponding function module.

Division into the modules in the embodiments of this application is an example, is merely division into logical functions, and may be other division during actual implementation. In addition, function modules in the embodiments of this application may be integrated into one processor, or each of the modules may exist alone physically, or two or more modules may be integrated into one module. The integrated module may be implemented in a form of hardware, or may be implemented in a form of a software function module.

Figure 9:
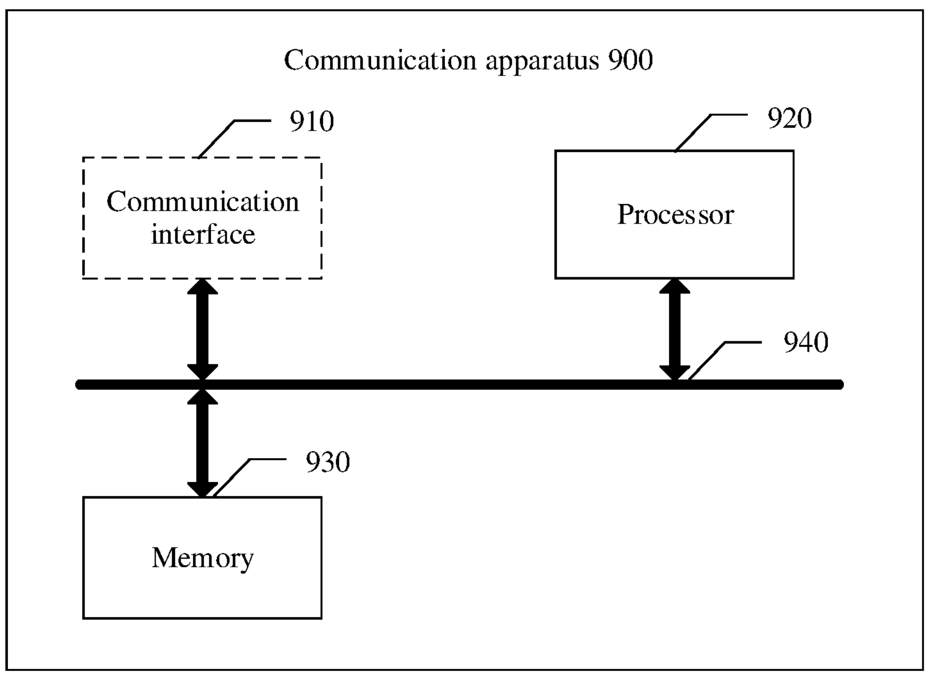
FIG. 9 is a schematic diagram of a structure of a communication apparatus according to an embodiment of this application.

FIG. 9 shows a communication apparatus 900 according to an embodiment of this application. The communication apparatus 900 may be a network device in the embodiment shown in FIG. 3, and can implement a function of the network device in the method provided in the embodiments of this application. The communication apparatus 900 may alternatively be an apparatus that can support the network device in implementing a function of the network device in the method provided in the embodiments of this application. The communication apparatus 900 may be a chip system. In this embodiment of this application, the chip system may include a chip, or may include the chip and another discrete component.

In hardware implementation, the communication module 702 may be a transceiver, and the transceiver is integrated into the communication apparatus 900 to form a communication interface 910.

The communication apparatus 900 includes at least one processor 920, configured to implement or support the communication apparatus 900 in implementing the functions of the network device in the method provided in the embodiments of this application. For example, the processor 920 may determine scheduling indication information. For details, refer to the detailed descriptions in the method examples.

The communication apparatus 900 may further include at least one memory 930, configured to store program instructions and/or data. The memory 930 is coupled to the processor 920. The coupling in this embodiment of this application is an indirect coupling or a communication connection between apparatuses, units, or modules, may be in an electrical form, a mechanical form, or another form, and is used for information exchange between the apparatuses, the units, or the modules. The processor 920 may operate with the memory 930 together. The processor 920 may execute the program instructions stored in the memory 930. At least one of the at least one memory may be included in the processor.

The communication apparatus 900 may further include a communication interface 910, configured to communicate with another device by using a transmission medium, so that an apparatus in the communication apparatus 900 can communicate with the another device. For example, the another device may be a terminal. The processor 920 may send and receive data by using the communication interface 910. The communication interface 910 may be specifically a transceiver.

In this embodiment of this application, a specific connection medium between the communication interface 910, the processor 920, and the memory 930 is not limited. In this embodiment of this application, the memory 930, the processor 920, and the communication interface 910 are connected by using a bus 940 in FIG. 9, and the bus is represented by a bold line in FIG. 9. A connection manner between other components is schematically described, and is not limited thereto. The bus may be classified into an address bus, a data bus, a control bus, and the like. For ease of representation, only one bold line is used to represent the bus in FIG. 9, but this does not mean that there is only one bus or only one type of bus.

In this embodiment of this application, the processor 920 may be a general-purpose processor, a digital signal processor, an application-specific integrated circuit, a field programmable gate array or another programmable logic device, a discrete gate or transistor logic device, or a discrete hardware component, and can implement or perform the methods, steps, and logical block diagrams disclosed in the embodiments of this application. The general-purpose processor may be a microprocessor, any conventional processor, or the like. The steps of the method disclosed with reference to the embodiments of this application may be directly performed and accomplished by using a hardware processor, or may be performed and accomplished by using a combination of hardware and software modules in the processor.

In the embodiments of this application, the memory 930 may be a non-volatile memory such as a hard disk drive (HDD) or a solid-state drive (SSD), or may be a volatile memory such as a random access memory (RAM). The memory is any other medium that can carry or store expected program code in a form of an instruction structure or a data structure and that can be accessed by a computer, but is not limited thereto. The memory in the embodiments of this application may alternatively be a circuit or any other apparatus that can implement a storage function, and is configured to store the program instructions and/or the data.

Figure 10:
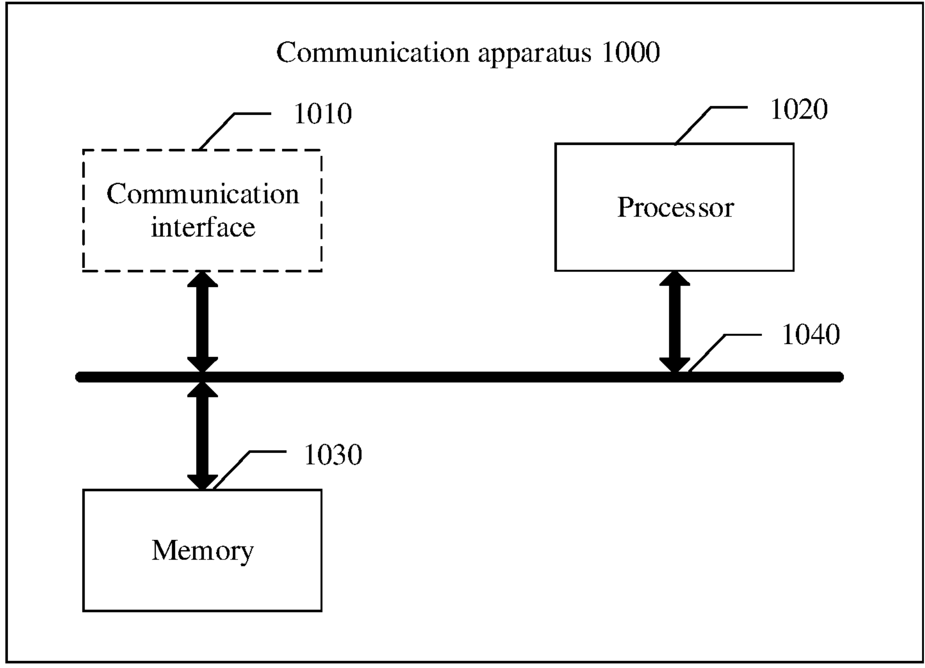
FIG. 10 is a schematic diagram of another structure of another communication apparatus according to an embodiment of this application.

FIG. 10 shows a communication apparatus 1000 according to an embodiment of this application. The communication apparatus 1000 may be a terminal, and can implement a function of the terminal in the method provided in the embodiments of this application. The communication apparatus 1000 may alternatively be an apparatus that can support the terminal in implementing functions of the terminal in the method provided in the embodiments of this application. The communication apparatus 1000 may be a chip system. In this embodiment of this application, the chip system may include a chip, or may include the chip and another discrete component.

In hardware implementation, the communication module 802 may be a transceiver, and the transceiver is integrated into the communication apparatus 1000 to form a communication interface 1010.

The communication apparatus 1000 includes at least one processor 1020, configured to implement or support the communication apparatus 1000 in implementing functions of the terminal in the method provided in the embodiments of this application. For example, the processor 1020 may perform transmission in one or more transmission units based on scheduling indication information. For details, refer to the detailed descriptions in the method examples.

The communication apparatus 1000 may further include at least one memory 1030, configured to store program instructions and/or data. The memory 1030 is coupled to the processor 1020. The coupling in this embodiment of this application is an indirect coupling or a communication connection between apparatuses, units, or modules, may be in an electrical form, a mechanical form, or another form, and is used for information exchange between the apparatuses, the units, or the modules. The processor 1020 may operate with the memory 1030 together. The processor 1020 may execute the program instructions stored in the memory 1030. At least one of the at least one memory may be included in the processor.

The communication apparatus 1000 may further include a communication interface 1010, configured to communicate with another device by using a transmission medium, so that an apparatus in the apparatus 1000 can communicate with the another device. For example, the another device may be a network device. The processor 1020 may send and receive data by using the communication interface 1010. The communication interface 1010 may be specifically a transceiver.

In this embodiment of this application, a specific connection medium between the communication interface 1010, the processor 1020, and the memory 1030 is not limited. In this embodiment of this application, the memory 1030, the processor 1020, and the communication interface 1010 are connected by using a bus 1040 in FIG. 10, and the bus is represented by a bold line in FIG. 10. A connection manner between other components is schematically described, and is not limited thereto. The bus may be classified into an address bus, a data bus, a control bus, and the like. For ease of representation, only one bold line is used to represent the bus in FIG. 10, but this does not mean that there is only one bus or only one type of bus.

In this embodiment of this application, the processor 1020 may be a general-purpose processor, a digital signal processor, an application-specific integrated circuit, a field programmable gate array or another programmable logic device, a discrete gate or transistor logic device, or a discrete hardware component, and can implement or perform the methods, steps, and logical block diagrams disclosed in the embodiments of this application. The general-purpose processor may be a microprocessor, any conventional processor, or the like. The steps of the method disclosed with reference to the embodiments of this application may be directly performed and accomplished by using a hardware processor, or may be performed and accomplished by using a combination of hardware and software modules in the processor.

In the embodiments of this application, the memory 1030 may be a non-volatile memory such as a hard disk drive (HDD) or a solid-state drive (SSD), or may be a volatile memory such as a random access memory (RAM). The memory is any other medium that can carry or store expected program code in a form of an instruction structure or a data structure and that can be accessed by a computer, but is not limited thereto. The memory in the embodiments of this application may alternatively be a circuit or any other apparatus that can implement a storage function, and is configured to store the program instructions and/or the data.

Figure 11:
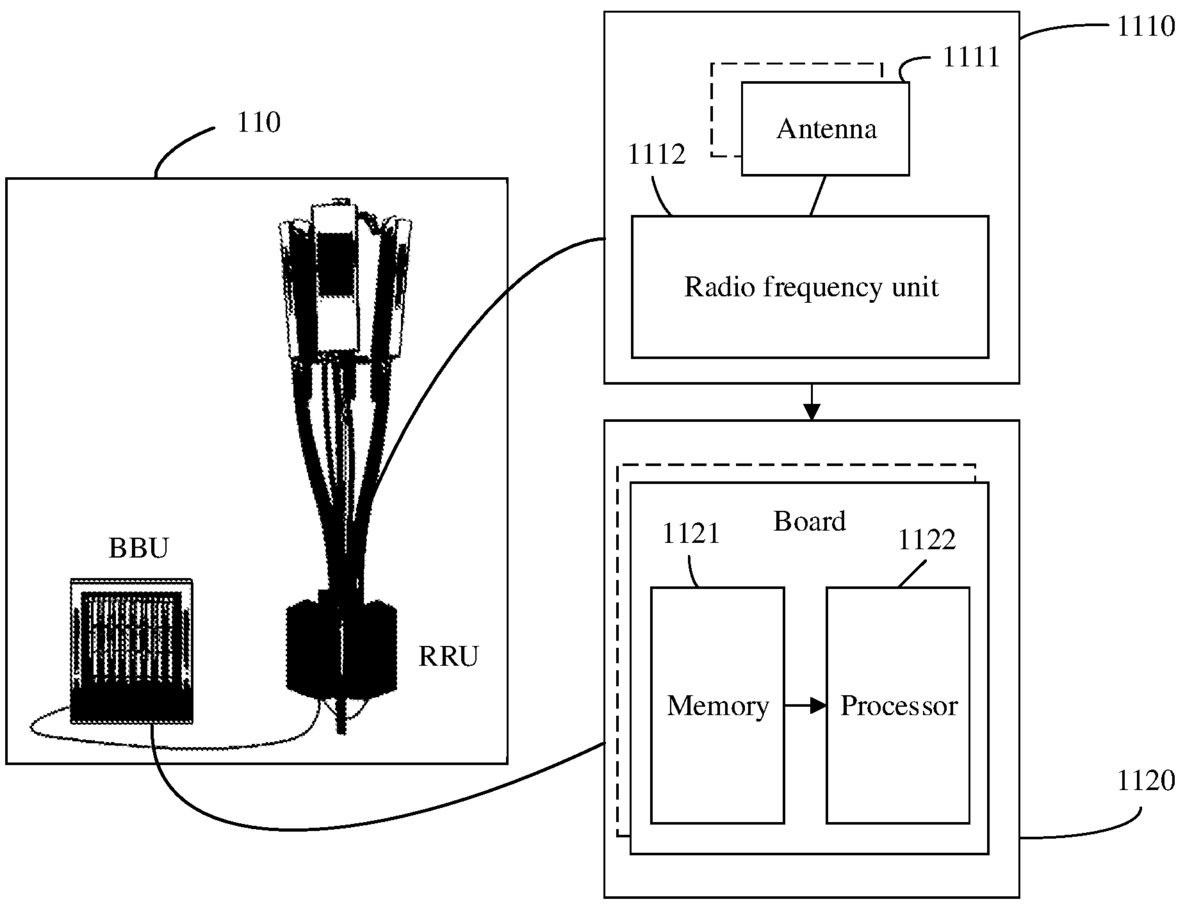
FIG. 11 is a schematic block diagram of a communication apparatus according to an embodiment of this application.

The communication apparatus in this embodiment of this application is an access network device. The access network device may be shown in FIG. 11, and the access network device may be used in the system shown in FIG. 2, to perform a function of the network device in the foregoing method embodiment. The access network device 110 may include one or more radio frequency units such as a remote radio unit (RRU) 1110 and one or more baseband units (BBUs) (which may also be referred to as digital units (DUs)) 1120. The RRU 1110 may be referred to as a communication module, and corresponds to the communication module 702 in FIG. 7. Optionally, the communication module may also be referred to as a transceiver machine, a transceiver circuit, a transceiver, or the like, and may include at least one antenna 1111 and a radio frequency unit 1112. The RRU 1110 is mainly configured to: receive and send a radio frequency signal, and perform conversion between the radio frequency signal and a baseband signal, for example, configured to send indication information to a terminal device. The BBU 1120 is mainly configured to perform baseband processing, control the base station, and the like. The RRU 1110 and the BBU 1120 may be physically disposed together, or may be physically separated, that is, in a distributed base station.

The BBU 1120 is a control center of the base station, may also be referred to as a processing module, may correspond to the processing module 701 in FIG. 7, and is mainly configured to implement a baseband processing function such as channel coding, multiplexing, modulation, or spreading. For example, the BBU (the processing module) may be configured to control the base station to perform an operation procedure related to the network device in the foregoing method embodiments, for example, generating the foregoing indication information.

In an example, the BBU 1120 may include one or more boards, and multiple boards may jointly support a radio access network (such as an LTE network) of a single access standard, or may separately support radio access networks (for example, an LTE network, a 5G network, or another network) of different access standards. The BBU 1120 further includes a memory 1121 and a processor 1122. The memory 1121 is configured to store necessary instructions and necessary data. The processor 1122 is configured to control the base station to perform a necessary action, for example, configured to control the base station to perform an operation procedure related to the network device in the foregoing method embodiments. The memory 1121 and the processor 1122 may serve one or more boards. In other words, the memory and the processor may be independently disposed on each board. Alternatively, the multiple boards may share the same memory and the same processor. In addition, each board may be further provided with a necessary circuit.

Figure 12:
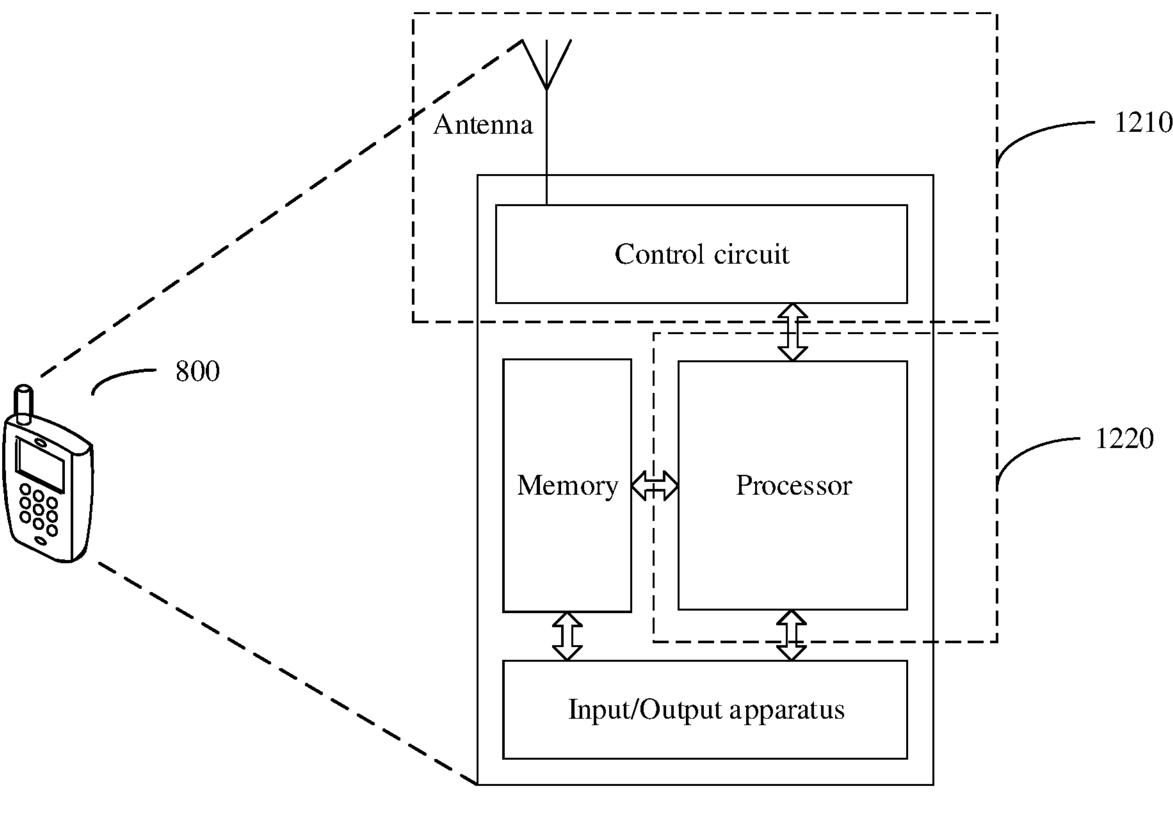
FIG. 12 is a schematic diagram of a structure of another communication apparatus according to an embodiment of this application.

In this embodiment of this application, the communication apparatus is a terminal. The terminal may be shown in FIG. 12. FIG. 12 is a simplified schematic diagram of a structure of the terminal. For ease of understanding and illustration, in FIG. 12, a mobile phone is used as an example of the terminal. As shown in FIG. 12, the terminal includes a processor, a memory, a radio frequency circuit, an antenna, and an input/output apparatus. The processor is mainly configured to: process a communication protocol and communication data, control the terminal, execute a software program, process data of the software program, and so on. The memory is mainly configured to store the software program and the data. The radio frequency circuit is mainly configured to: perform conversion between a baseband signal and a radio frequency signal, and process the radio frequency signal. The antenna is mainly configured to receive and send a radio frequency signal in a form of an electromagnetic wave. The input/output apparatus, such as a touchscreen, a display, or a keyboard, is mainly configured to: receive data entered by a user and output data to the user. It should be noted that some types of terminals may not have an input/output apparatus.

When needing to send data, after performing baseband processing on the to-be-sent data, the processor outputs a baseband signal to the radio frequency circuit; the radio frequency circuit performs radio frequency processing on the baseband signal and then sends the radio frequency signal to the outside in a form of an electromagnetic wave by using the antenna. When data is sent to the terminal, the radio frequency circuit receives a radio frequency signal by using the antenna, converts the radio frequency signal into a baseband signal, and outputs the baseband signal to the processor. The processor converts the baseband signal into data, and processes the data. For ease of description, FIG. 12 shows only one memory and one processor. In an actual terminal product, there may be one or more processors and one or more memories. The memory may also be referred to as a storage medium, a storage device, or the like. The memory may be disposed independent of the processor, or may be integrated with the processor. This is not limited in the embodiments of this application.

In an optional implementation, the processor may include a baseband processor and/or a central processing unit. The baseband processor is mainly configured to process the communication protocol and the communication data. The central processing unit is mainly configured to: control the entire terminal, execute the software program, and process the data of the software program. Functions of the baseband processor and the central processing unit may be integrated into the processor in FIG. 12. A person skilled in the art may understand that the baseband processor and the central processing unit each may be an independent processor, and are interconnected by using a technology such as a bus. A person skilled in the art may understand that the terminal may include multiple baseband processors to adapt to different network standards, and the terminal may include multiple central processing units to enhance a processing capability of the terminal. All components of the terminal may be connected by using various buses. The baseband processor may also be expressed as a baseband processing circuit or a baseband processing chip. The central processing unit may also be expressed as a central processing circuit or a central processing chip. A function of processing the communication protocol and communication data may be embedded into the processor, or may be stored in the storage unit in a form of a software program, so that the processor executes the software program to implement a baseband processing function.

In this embodiment of this application, the antenna and the control circuit that have sending and receiving functions may be considered as a transceiver unit of the terminal, for example, to support the terminal in performing the receiving function and the sending function in FIG. 3. A processor having a processing function is considered as a processing unit of the terminal. As shown in FIG. 12, the terminal includes a transceiver unit 1210 and a processing unit 1220.

The transceiver unit may also be referred to as a transceiver, a transceiver machine, a transceiver apparatus, or the like. The processing unit may also be referred to as a processor, a processing board, a processing module, a processing apparatus, and the like. Optionally, a component that is in the transceiver unit 1210 and that is configured to implement the receiving function may be considered as a receiving unit, and a component that is in the transceiver unit 1210 and that is configured to implement the sending function may be considered as a sending unit. In other words, the transceiver unit 1210 includes the receiving unit and the sending unit. The transceiver unit sometimes may also be referred to as a transceiver machine, a transceiver, a transceiver circuit, or the like. The receiving unit sometimes may also be referred to as a receiver machine, a receiver, a receiving circuit, or the like. The sending unit sometimes may also be referred to as a transmitter machine, a transmitter, a transmitter circuit, or the like.

It should be understood that the transceiver unit 1210 is configured to perform a sending operation and a receiving operation on a terminal side in the foregoing method embodiments, and the processing unit 1220 is configured to perform an operation other than the receiving/sending operation of the terminal in the foregoing method embodiments.

For example, in an implementation, the transceiver unit 1210 is configured to perform the receiving operation on the terminal side in step S32 in the embodiment shown in FIG. 3, and/or the transceiver unit 1210 is further configured to perform other receiving and sending steps on the terminal side in the embodiments of this application. The processing unit 1220 is configured to perform step S33 in the embodiment shown in FIG. 3, and/or the processing unit 1220 is further configured to perform other processing steps on the terminal side in the embodiments of this application. The processor 1220 may be configured to execute instructions stored in the memory, to control the transceiver unit 1210 to receive a signal and/or send a signal, to complete a function of the terminal in the foregoing method embodiments. In an implementation, it may be considered that the function of the transceiver unit 1210 is implemented by using a transceiver circuit or a transceiver-dedicated chip.

When the communication apparatus is a chip, the chip includes a transceiver unit and a processing unit. The transceiver unit may be an input/output circuit or a communication interface. The processing unit may be a processor, a microprocessor, or an integrated circuit, integrated on the chip.

Figure 13:
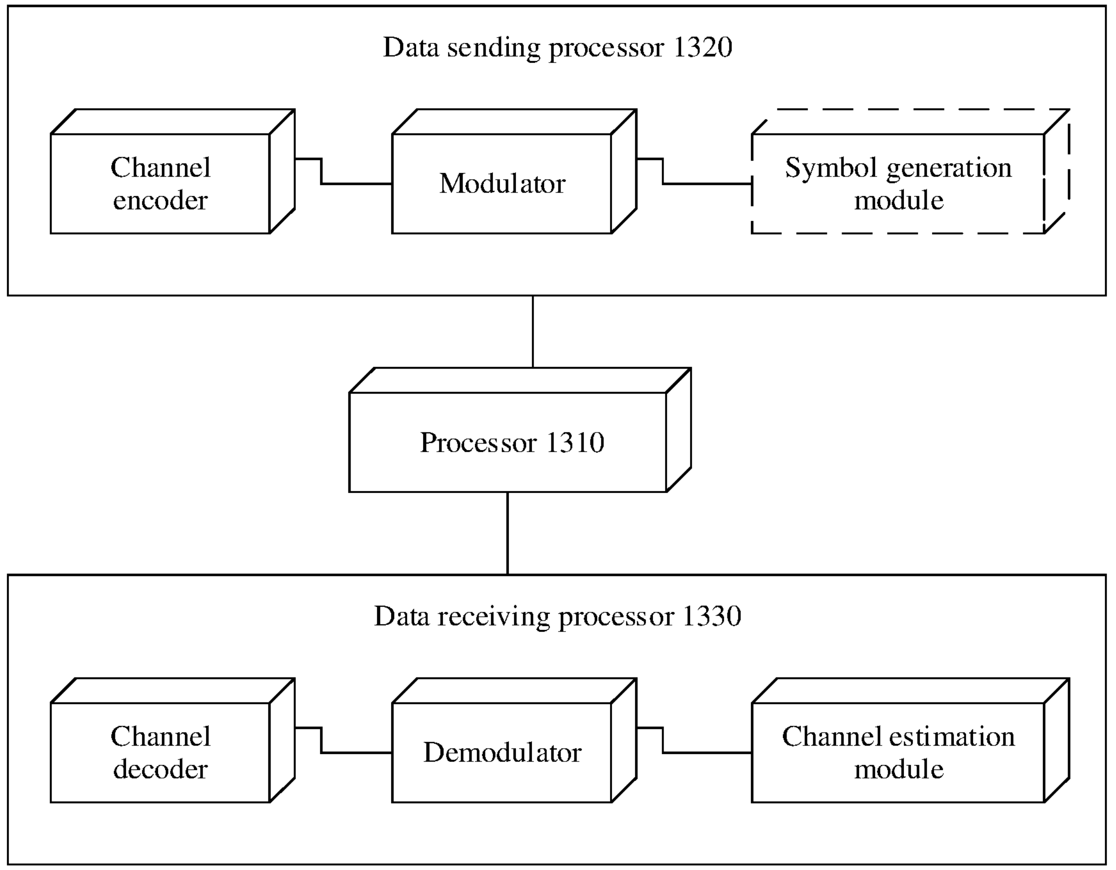
FIG. 13 is a schematic diagram of another structure of another communication apparatus according to an embodiment of this application.

When the communication apparatus in this embodiment is a terminal, refer to a device shown in FIG. 13. In an example, the device may implement a function similar to that of the processor 1020 in FIG. 10. In FIG. 13, the device includes a processor 1310, a data sending processor 1320, and a data receiving processor 1330. The processing module 801 in the foregoing embodiment may be the processor 1310 in FIG. 13, and implements a corresponding function. The communication module 802 in the foregoing embodiment may be the data sending processor 1320 and/or the data receiving processor 1330 in FIG. 13. Although FIG. 13 shows a channel encoder and a channel decoder, it may be understood that these modules are merely examples, and do not constitute a limitation on this embodiment.

Figure 14:
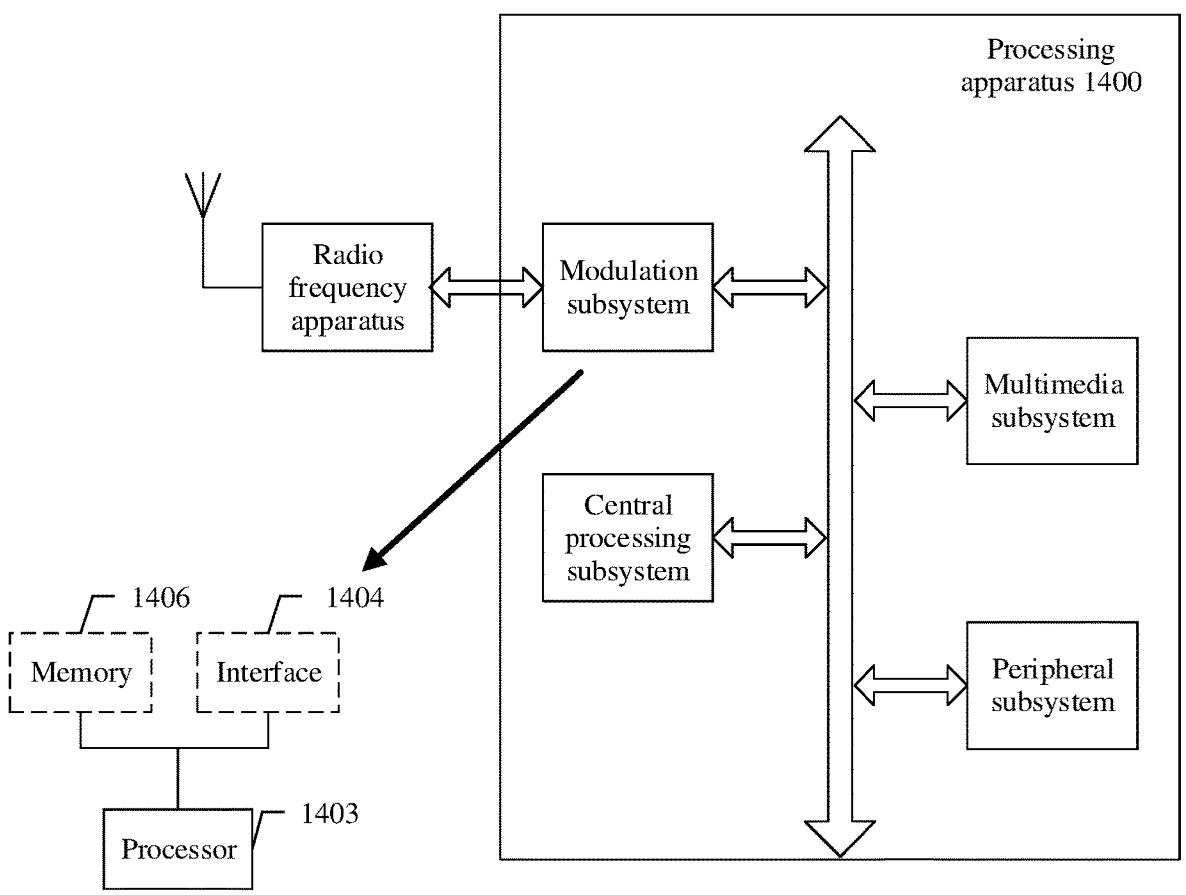
FIG. 14 is a schematic diagram of still another structure of another communication apparatus according to an embodiment of this application.

FIG. 14 shows another form of this embodiment. A processing apparatus 1400 includes modules such as a modulation subsystem, a central processing subsystem, and a peripheral subsystem. A communication apparatus in this embodiment may be used as the modulation subsystem in the processing apparatus 1400. Specifically, the modulation subsystem may include a processor 1403 and an interface 1404. The processor 1403 implements a function of the processing module 801, and the interface 1404 implements a function of the communication module 802. In another variation, the modulation subsystem includes a memory 1406, a processor 1403, and a program that is stored in the memory 1406 and that can be run on the processor. When executing the program, the processor 1403 implements the method on the terminal side in the foregoing method embodiments. It should be noted that the memory 1406 may be non-volatile or volatile, and may be located inside the modulation subsystem or in the processing apparatus 1400, provided that the memory 1406 can be connected to the processor 1403.

In an example implementation, the communication apparatus 900 is used as an example. The communication apparatus 900 includes a means configured to determine scheduling indication information and a means configured to send the scheduling indication information. One or more processors may be used to implement functions of the means for generating the scheduling indication information and the means for sending the scheduling indication information. For example, the scheduling indication information may be generated by using the one or more processors, and the scheduling indication information may be sent by using a transceiver, an input/output circuit, or an interface of a chip. For the scheduling indication information, refer to related descriptions in the foregoing method embodiments.

In an example implementation, the communication apparatus 900 includes a means configured to receive scheduling indication information and a means configured to perform data transmission based on the scheduling indication information. For the scheduling indication information and how the data transmission is performed in one or more transmission units based on the scheduling indication information, refer to the related descriptions in the foregoing method embodiments. For example, the scheduling indication information may be received by using a transceiver, an input/output circuit, or an interface of a chip, and the data transmission is performed in the one or more transmission units based on the scheduling indication information by using the one or more processors.

Optionally, in addition to the method in the embodiment shown in FIG. 3, the processor 901 may further implement another function.

In still another example embodiments, the communication apparatus 900 may alternatively include a circuit. The circuit may implement a function of the network device or the terminal in the foregoing method embodiments.

In still another example, the communication apparatus 900 may include one or more memories, storing instructions. The instructions may be run on the processor, so that the communication apparatus 900 performs the method described in the foregoing method embodiments. Optionally, the memory may further store data. Optionally, the processor may also store instructions and/or data. For example, the one or more memories may store the correspondence described in the foregoing embodiments, or the related parameter, table, or the like in the foregoing embodiments. The processor and the memory may be disposed separately, or may be integrated together.

In still another an example implementation, the communication apparatus 900 may further include a radio frequency unit 1112 and an antenna 1111. The processor 1122 may be referred to as a processing unit, and controls the communication apparatus (the terminal or a base station). The radio frequency unit 1112 may be referred to as a transceiver machine, a transceiver circuit, a transceiver, or the like, and is configured to implement receiving and sending functions of the communication apparatus by using the antenna 1111.

This application further provides a communication system, including the foregoing one or more network devices and one or more terminals.

It should be noted that, the processor in the embodiments of this application may be an integrated circuit chip, and has a signal processing capability. In an implementation process, the steps in the foregoing method embodiments can be completed by using a hardware integrated logical circuit in the processor, or by using instructions in a form of software. The processor may be a general-purpose processor, a digital signal processor (DSP), an application-specific integrated circuit (ASIC), a field programmable gate array (FPGA) or another programmable logic device, a discrete gate or a transistor logic device, or a discrete hardware component. The processor may implement or perform the methods, the steps, and logical block diagrams in the embodiments of this application. The general-purpose processor may be a microprocessor, or the processor may be any conventional processor or the like. The steps of the method disclosed with reference to the embodiments of this application may be directly performed and accomplished by using a hardware decoding processor, or may be performed and accomplished by using a combination of hardware and software modules in a decoding processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing method in combination with hardware of the processor.

It may be understood that the memory in the embodiments of this application may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limitative descriptions, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM). It should be noted that the memories in the systems and methods described in this specification include but are not limited to these memories and any memory of another proper type.

An embodiment of this application further provides a computer-readable medium. The computer-readable medium stores a computer program. When the computer program is executed by a computer, the resource scheduling method in any one of the foregoing method embodiments is implemented.

An embodiment of this application further provides a computer program product. When the computer program product is executed by a computer, the resource scheduling method in any one of the foregoing method embodiments is implemented.

All or some of the foregoing embodiments may be implemented by using software, hardware, firmware, or any combination thereof. When being implemented by using the software, all or some of the embodiments may be implemented in a form of a computer program product. The computer program product includes one or more computer instructions. When the computer instructions are loaded and executed on a computer, the procedures or functions according to the embodiments of this application are all or partially generated. The computer may be a general-purpose computer, a dedicated computer, a computer network, or another programmable apparatus. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid-state drive (SSD)), or the like.

An embodiment of this application further provides a processing apparatus, including a processor and an interface. The processor is configured to perform the resource scheduling method in any one of the foregoing method embodiments.

It should be understood that the foregoing processing apparatus may be a chip. The processor may be implemented by using hardware, or may be implemented by using software. When being implemented by using hardware, the processor may be a logic circuit, an integrated circuit, or the like. When being implemented by using software, the processor may be a general-purpose processor, and is implemented by reading software code stored in a memory. The memory may be integrated into the processor, or may exist independently outside the processor.

It should be understood that "one embodiment" or "an embodiment" mentioned in the entire specification means that particular features, structures, or characteristics related to this embodiment are included in at least one embodiment of this application. Therefore, "in one embodiment" or "in an embodiment" appearing throughout the entire specification does not necessarily refer to a same embodiment. In addition, these particular features, structures, or characteristics may be combined in one or more embodiments in any proper manner. It should be understood that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

In addition, the terms "system" and "network" in this specification may be often used interchangeably in this specification. The term "and/or" in this specification describes only an association relationship between associated objects and represents that three relationships may exist. For example, A and/or B may represent the following three cases: Only A exists, both A and B exist, and only B exists. In addition, the character "/" in this specification usually indicates an "or" relationship between the associated objects.

It should be understood that in the embodiments of this application, "B corresponding to A" indicates that B is associated with A, and B may be determined based on A. However, it should be further understood that determining B based on A does not mean that B is determined based on only A. B may alternatively be determined based on A and/or other information.

A person of ordinary skill in the art may be aware that, the units and steps in the examples described with reference to the embodiments disclosed herein may be implemented by electronic hardware, computer software, or a combination thereof. To clearly describe the interchangeability between the hardware and the software, the foregoing has generally described compositions and steps of each example based on functions. Whether the functions are performed by hardware or software depends on particular applications and design constraints of the technical solutions. A person skilled in the art may use different methods to implement the described functions for each particular application, but it should not be considered that the implementation goes beyond the scope of this application.

A person skilled in the art may clearly understand that, for the purpose of convenient and brief description, for detailed working processes of the foregoing system, apparatus, and unit, refer to corresponding processes in the foregoing method embodiments.

In the several embodiments provided in this application, it should be understood that the disclosed systems, apparatuses, and methods may be implemented in other manners. For example, the foregoing apparatus embodiments are merely examples. For example, the unit division is merely logical function division and may be other division during actual implementation. For example, multiple units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or another form.

The units described as separate parts may or may not be physically separate, and parts displayed as units may or may not be physical units, may be located in one position, or may be distributed on multiple network units. Some or all of the units may be selected based on actual requirements to achieve the objectives of the solutions of the embodiments in this application.

In addition, function units in the embodiments of this application may be integrated into one processing unit, or each of the units may exist alone physically, or two or more units are integrated into one unit. The integrated unit may be implemented in a form of hardware, or may be implemented in a form of a software function unit.

With descriptions of the foregoing implementations, a person skilled in the art may clearly understand that this application may be implemented by hardware, firmware, or a combination thereof. When this application is implemented by software, the foregoing functions may be stored in a computer-readable medium or transmitted as one or more instructions or code in the computer-readable medium. The computer-readable medium includes a computer storage medium and a communication medium, where the communication medium includes any medium that facilitates transmission of a computer program from one place to another place. The storage medium may be any available medium accessible to a computer. The following provides an example but does not impose a limitation: The computer-readable medium may include a RAM, a ROM, an EEPROM, a CD-ROM, another compact disc storage or magnetic disk storage medium, another magnetic storage device, or any other medium that can carry or store expected program code in a form of an instruction or a data structure and can be accessed by the computer. In addition, any connection may be properly defined as a computer-readable medium. For example, if software is transmitted from a website, a server, or another remote source by using a coaxial cable, an optical fiber/cable, a twisted pair, a digital subscriber line (DSL) or wireless technologies such as infrared ray, radio and microwave, the coaxial cable, optical fiber/cable, twisted pair, DSL or wireless technologies such as infrared ray, radio and microwave all fall within the definitions of the media. For example, a disk and a disc used in this application include a compact disc (CD), a laser disc, an optical disc, a digital versatile disc (DVD), a floppy disk, and a Blu-ray disc. The disk usually uses magnetism to copy data, and the disc uses lasers to copy data. The foregoing combination should also be included in the protection scope of the computer-readable medium.

In summary, what is described above is merely examples of the embodiments of the technical solutions of this application, but is not intended to limit the protection scope of this application. Any modification, equivalent replacement, or improvement made without departing from the spirit and principle of this application shall fall within the protection scope of this application.

What is claimed is:

1. A resource scheduling method, comprising:

determining, by a network device, scheduling indication information, wherein the scheduling indication information indicates to schedule a plurality of transmission units, and the plurality of transmission units comprises a first transmission unit and a second transmission unit, wherein the first transmission unit and the second transmission unit are adjacent transmission units and there is a gap, indicated by the scheduling indication information, between the first transmission unit and the second transmission unit, the first transmission unit is used for transmitting a first transport block and the second transmission unit is used for transmitting a second transport block, the gap comprises at least part of a transport block; the scheduling indication information comprises a time domain resource allocation parameter, the time domain resource allocation parameter indicates first offset information and second offset information, wherein the first offset information corresponds to the first transmission unit, and the second offset information corresponds to the second transmission unit; wherein the first transmission unit is used for transmission of a first part of a third transport block, and the second transmission unit is used for transmission of a second part of the third transport block; and sending, by the network device, the scheduling indication information to a terminal.

2. The method according to claim 1, wherein the scheduling indication information further indicates the terminal to perform transmission based on a scheduling indication of the network device, or the scheduling indication information further indicates the terminal to perform transmission based on a result of listen before talk (LBT).

3. The method according to claim 1, wherein the scheduling indication information comprises a plurality of scheduling parameters, wherein each of the plurality of scheduling parameters comprises one value; or at least one of the plurality of scheduling parameters comprises a plurality of values, and another parameter of the plurality of scheduling parameters other than the at least one scheduling parameter comprises one value.

4. The method according to claim 3, wherein the at least one scheduling parameter is one or more of the following parameters: a time domain resource allocation parameter, a frequency domain resource allocation parameter, code block group (CBG) indication information, and a start symbol parameter.

5. The method according to claim 1, wherein the first transmission unit is the 1$^{st}$ transmission unit in the plurality of transmission units, and the second transmission unit is another transmission unit other than the 1$^{st}$ transmission unit in the plurality of transmission units; or the first transmission unit is the last transmission unit in the plurality of transmission units, and the second transmission unit is another transmission unit other than the last transmission unit in the plurality of transmission units.

6. The method according to claim 1, wherein the scheduling indication information comprises one piece of gap indication information; or the scheduling indication information comprises a plurality of pieces of gap indication information, wherein one transmission unit corresponds to one piece of gap indication information; and the gap indication information indicates at least one gap length.

7. The method according to claim 1, wherein at least one of the first transmission unit and the second transmission unit is a resource about one of: a physical downlink shared channel (PDSCH) or a physical uplink shared channel (PUSCH).

8. The method according to claim 1, wherein the first offset information is different from the second offset information.

9. The method according to claim 1, wherein at least one of the first offset information and the second offset information is an offset relative to a time unit in which the scheduling indication information is received.

10. The method according to claim 1, wherein the time domain resource allocation parameter further indicates a first mapping mode and a second mapping mode, the first mapping mode corresponds to the first transmission unit and the second mapping mode corresponds to the second transmission unit.

11. A resource scheduling method, comprising:

receiving, by a terminal, scheduling indication information from a network device, wherein the scheduling indication information indicates that a plurality of transmission units are scheduled for the terminal to perform transmission, and the plurality of transmission units comprises a first transmission unit and a second transmission unit, wherein the first transmission unit and the second transmission unit are adjacent transmission units and there is a gap, indicated by the scheduling indication information, between the first transmission unit and the second transmission unit, the first transmission unit is used for transmitting a first transport block and the second transmission unit is used for transmitting a second transport block, the gap comprises at least part of a transport block; the scheduling indication information comprises a time domain resource allocation parameter, the time domain resource allocation parameter indicates first offset information and second offset information, wherein the first offset information corresponds to the first transmission unit, and the second offset information corresponds to the second transmission unit; wherein the first transmission unit is used for transmission of a first part of a third transport block, and the second transmission unit is used for transmission of a second part of the third transport block; and performing, by the terminal, transmission in the plurality of transmission units based on the scheduling indication information.

12. The method according to claim 11, wherein the scheduling indication information further indicates the terminal to perform transmission based on a scheduling indication of the network device, or the scheduling indication information further indicates the terminal to perform transmission based on a result of listen before talk (LBT).

13. The method according to claim 11, wherein the scheduling indication information comprises a plurality of scheduling parameters, wherein each of the plurality of scheduling parameters comprises one value; or at least one of the plurality of scheduling parameters comprises a plurality of values, and another parameter of the plurality of scheduling parameters other than the at least one scheduling parameter comprises one value.

14. The method according to claim 13, wherein the at least one scheduling parameter is one or more of the following parameters: a time domain resource allocation parameter, a frequency domain resource allocation parameter, code block group (CBG) indication information, and a start symbol parameter.

15. The method according to claim 11, wherein the first transmission unit is the $1^{st}$ transmission unit in the plurality of transmission units, and the second transmission unit is another transmission unit other than the $1^{st}$ transmission unit in the plurality of transmission units; or the first transmission unit is the last transmission unit in the plurality of transmission units, and the second transmission unit is another transmission unit other than the last transmission unit in the plurality of transmission units.

16. The method according to claim 11, wherein the scheduling indication information comprises one piece of gap indication information; or the scheduling indication information comprises a plurality of pieces of gap indication information, wherein one transmission unit corresponds to one piece of gap indication information; and the gap indication information indicates at least one gap length.

17. The method according to claim 11, wherein at least one of the first transmission unit and the second transmission unit is a resource about one of: a physical downlink shared channel (PDSCH) or a physical uplink shared channel (PUSCH).

18. The method according to claim 11, wherein the first offset information is different from the second offset information.

19. The method according to claim 11, wherein at least one of the first offset information and the second offset information is an offset relative to a time unit in which the scheduling indication information is received.

20. The method according to claim 11, wherein the time domain resource allocation parameter further indicates a first mapping mode and a second mapping mode, the first mapping mode corresponds to the first transmission unit and the second mapping mode corresponds to the second transmission unit.

21. A communication apparatus, comprising:

a processor, configured to determine scheduling indication information, wherein the scheduling indication information indicates to schedule a plurality of transmission units, and the plurality of transmission units comprises a first transmission unit and a second transmission unit, wherein the first transmission unit and the second transmission unit are adjacent transmission units and there is a gap, indicated by the scheduling indication information, between the first transmission unit and the second transmission unit, the first transmission unit is used for transmitting a first transport block and the second transmission unit is used for transmitting a second transport block, the gap comprises at least part of a transport block; the scheduling indication information comprises a time domain resource allocation parameter, the time domain resource allocation parameter indicates first offset information and second offset information, wherein the first offset information corresponds to the first transmission unit, and the second offset information corresponds to the second transmission unit; wherein the first transmission unit is used for transmission of a first part of a third transport block, and the second transmission unit is used for transmission of a second part of the third transport block; and a transceiver, configured to send the scheduling indication information to a terminal under control of the processor.

22. The communication apparatus according to claim 21, wherein the scheduling indication information further indicates the terminal to perform transmission based on a scheduling indication of the network device, or the scheduling indication information further indicates the terminal to perform transmission based on a result of listen before talk (LBT).

23. The communication apparatus according to claim 21, wherein the scheduling indication information comprises a plurality of scheduling parameters, wherein each of the plurality of scheduling parameters comprises one value; or at least one of the plurality of scheduling parameters comprises a plurality of values, and another parameter other than the at least one scheduling parameter comprises one value.

24. The communication apparatus according to claim 23, wherein the at least one scheduling parameter is one or more of the following parameters: a time domain resource allocation parameter, a frequency domain resource allocation parameter, code block group (CBG) indication information, and a start symbol parameter.

25. The communication apparatus according to claim 21, wherein the first transmission unit is the 1$^{st}$ transmission unit in the plurality of transmission units, and the second transmission unit is another transmission unit other than the 1$^{st}$ transmission unit in the plurality of transmission units; or the first transmission unit is the last transmission unit in the plurality of transmission units, and the second transmission unit is another transmission unit other than the last transmission unit in the plurality of transmission units.

26. The communication apparatus according to claim 21, wherein the scheduling indication information comprises one piece of gap indication information; or the scheduling indication information comprises a plurality of pieces of gap indication information, wherein one transmission unit corresponds to one piece of gap indication information, and the gap indication information indicates at least one gap length.

27. The communication apparatus according to claim 21, wherein at least one of the first transmission unit and the second transmission unit is a resource about one of: a physical downlink shared channel (PDSCH) or a physical uplink shared channel (PUSCH).

28. The communication apparatus according to claim 21, wherein the first offset information is different from the second offset information.

29. The communication apparatus according to claim 21, wherein at least one of the first offset information and the second offset information is an offset relative to a time unit in which the scheduling indication information is received.

30. The communication apparatus according to claim 21, wherein the time domain resource allocation parameter further indicates a first mapping mode and a second mapping mode, the first mapping mode corresponds to the first transmission unit and the second mapping mode corresponds to the second transmission unit.

31. A communication apparatus, comprising:

a transceiver, configured to receive scheduling indication information from a network device, wherein the scheduling indication information indicates that a plurality of transmission units are scheduled for the communication apparatus to perform transmission, and the plurality of transmission units comprises a first transmission unit and a second transmission unit, wherein the first transmission unit and the second transmission unit are adjacent transmission units and there is a gap, indicated by the scheduling indication information, between the first transmission unit and the second transmission unit, the first transmission unit is used for transmitting a first transport block and the second transmission unit is used for transmitting a second transport block, the gap comprises at least part of a transport block; the scheduling indication information comprises a time domain resource allocation parameter, the time domain resource allocation parameter indicates first offset information and second offset information, wherein the first offset information corresponds to the first transmission unit, and the second offset information corresponds to the second transmission unit; wherein the first transmission unit is used for transmission of a first part of a third transport block, and the second transmission unit is used for transmission of a second part of the third transport block; and a processor, configured to perform transmission in the transmission unit or the plurality of transmission units based on the scheduling indication information.

32. The communication apparatus according to claim 31, wherein the scheduling indication information further indicates the communication apparatus to perform transmission based on a scheduling indication of the network device, or the scheduling indication information further indicates the communication apparatus to perform transmission based on a result of listen before talk (LBT).

33. The communication apparatus according to claim 31, wherein the scheduling indication information comprises a plurality of scheduling parameters, wherein each of the plurality of scheduling parameters comprises one value; or at least one of the plurality of scheduling parameters comprises a plurality of values, and another parameter of the plurality of scheduling parameters other than the at least one scheduling parameter comprises one value.

34. The communication apparatus according to claim 33, wherein the at least one scheduling parameter is one or more of the following parameters: a time domain resource allocation parameter, a frequency domain resource allocation parameter, code block group (CBG) indication information, and a start symbol parameter.

35. The communication apparatus according to claim 31, wherein the first transmission unit is the 1$^{st}$ transmission unit in the plurality of transmission units, and the second transmission unit is another transmission unit other than the 1$^{st}$ transmission unit in the plurality of transmission units; or the first transmission unit is the last transmission unit in the plurality of transmission units, and the second transmission unit is another transmission unit other than the last transmission unit in the plurality of transmission units.

36. The communication apparatus according to claim 31, wherein the scheduling indication information comprises one piece of gap indication information; or the scheduling indication information comprises a plurality of pieces of gap indication information, wherein one transmission unit corresponds to one piece of gap indication information, and the gap indication information indicates at least one gap length.

37. The communication apparatus according to claim 31, wherein at least one of the first transmission unit and the second transmission unit is a resource about one of: a physical downlink shared channel (PDSCH) or a physical uplink shared channel (PUSCH).

38. The communication apparatus according to claim 31, wherein the first offset information is different from the second offset information.

39. The communication apparatus according to claim 31, wherein at least one of the first offset information and the second offset information is an offset relative to a time unit in which the scheduling indication information is received.

40. The communication apparatus according to claim 31, wherein the time domain resource allocation parameter further indicates a first mapping mode and a second mapping mode, the first mapping mode corresponds to the first transmission unit and the second mapping mode corresponds to the second transmission unit.

* * * * *